United States Patent
Oyama et al.

(10) Patent No.: US 10,784,724 B2
(45) Date of Patent: Sep. 22, 2020

(54) WIRELESS POWER SUPPLY DEVICE, TELEMETRIC MEASURING SYSTEM, ROTATING MACHINE, SYSTEM FOR SUPPLYING POWER WIRELESSLY TO ROTATING BODY, AND TURBINE SYSTEM

(71) Applicant: MITSUBISHI HEAVY INDUSTRIES, LTD., Tokyo (JP)

(72) Inventors: Naoki Oyama, Tokyo (JP); Hideaki Murata, Tokyo (JP); Jun Yasui, Tokyo (JP); Seiki Kato, Tokyo (JP); Keiichi Morishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 70 days.

(21) Appl. No.: 16/301,540

(22) PCT Filed: May 16, 2017

(86) PCT No.: PCT/JP2017/018428
§ 371 (c)(1),
(2) Date: Nov. 14, 2018

(87) PCT Pub. No.: WO2017/199981
PCT Pub. Date: Nov. 23, 2017

(65) Prior Publication Data
US 2019/0181689 A1 Jun. 13, 2019

(30) Foreign Application Priority Data

May 16, 2016 (JP) .................................. 2016-098194
Mar. 30, 2017 (JP) .................................. 2017-067492

(51) Int. Cl.
*H02J 50/20* (2016.01)
*F01D 25/00* (2006.01)
(Continued)

(52) U.S. Cl.
CPC .............. *H02J 50/20* (2016.02); *F01D 25/00* (2013.01); *F02C 7/00* (2013.01); *H02J 50/40* (2016.02)

(58) Field of Classification Search
CPC ....................................................... H02J 50/20
See application file for complete search history.

(56) References Cited

U.S. PATENT DOCUMENTS 6,950,633 B2 * 9/2005 Kojima ................. B60R 16/027
333/260
10,481,269 B2 * 11/2019 Pacala .................... H05K 1/144
(Continued)

FOREIGN PATENT DOCUMENTS

| JP | 2003-332835 | 11/2003 |
| JP | 2008-092703 | 4/2008 |

(Continued)

OTHER PUBLICATIONS

International Search Report dated Jul. 18, 2017 in International (PCT) Application No. PCT/JP2017/018428 with English translation.

(Continued)

*Primary Examiner* — Daniel J Cavallari
(74) *Attorney, Agent, or Firm* — Wenderoth, Lind & Ponack, L.L.P.

(57) ABSTRACT

A wireless power supply device that wirelessly supplies power from a stator side to a plurality of power-receiving antennas disposed on a rotor rotated about an axis (O) at intervals in a circumferential direction includes: an oscillator (90) that oscillates a high-frequency signal; and an annular power transmitter (71) that has a leaky waveguide (80) in which a plurality of radiating portions (83) that radiate the high-frequency signal as a radio wave are arranged in the (Continued)

circumferential direction and extend in a circular arc shape in the circumferential direction.

6 Claims, 13 Drawing Sheets

(51) Int. Cl.
    *H02J 50/40* (2016.01)
    *F02C 7/00* (2006.01)

(56) References Cited

U.S. PATENT DOCUMENTS

| | | | |
|---|---|---|---|
| 10,491,052 B2 * | 11/2019 | Lenius | ............... B60L 3/0015 |
| 2004/0174315 A1 | 9/2004 | Miyata | |
| 2014/0052410 A1 | 2/2014 | Tralshawala et al. | |

FOREIGN PATENT DOCUMENTS

| | | |
|---|---|---|
| JP | 2013-519259 | 5/2013 |
| JP | 2014-051971 | 3/2014 |
| JP | 5611370 | 10/2014 |
| JP | 2015-173575 | 10/2015 |
| JP | 2016-039464 | 3/2016 |
| JP | 6012229 | 10/2016 |
| WO | 2011/094679 | 8/2011 |

OTHER PUBLICATIONS

Written Opinion of the International Searching Authority dated Jul. 18, 2017 in International (PCT) Application No. PCT/JP2017/018428 with English translation.

* cited by examiner

WIRELESS POWER SUPPLY DEVICE, TELEMETRIC MEASURING SYSTEM, ROTATING MACHINE, SYSTEM FOR SUPPLYING POWER WIRELESSLY TO ROTATING BODY, AND TURBINE SYSTEM

TECHNICAL FIELD

The present invention relates to a wireless power supply device, a telemetric measuring system, and a rotating machine. Further, the present invention relates to a system for wirelessly supplying power to a rotating body, and a turbine system and is useful for application to the case where power is wirelessly supplied to transmitters that transmit information used to monitor a rotating machine such as a turbine.

Priority is claimed on Japanese Patent Application No. 2016-098194 filed May 16, 2016 and on Japanese Patent Application No. 2017-067492 filed Mar. 30, 2017, the contents of which are incorporated herein by reference.

BACKGROUND ART

A telemetric measuring system is known as an operation monitoring system that monitors an operation situation of a rotating machine such as a gas turbine. The telemetric measuring system detects states of the blades by means of, for example, a plurality of sensors mounted in the blades of the turbine. Detected information of these sensors is wirelessly transmitted to a stationary side by transmitters that are provided on a rotary side to correspond to the respective sensors.

Here, power that drives the sensors and the transmitters mounted on the rotary side is wirelessly supplied from the stationary side to a power-receiving module of the rotary side by a wireless power supply device. As this wireless power supply device, an induction power-supplying type wireless power supply device that wirelessly supplies power to a power-receiving coil of the rotary side by means of a power-transmitting coil of the stationary side is known (e.g., see Patent Literature 1).

In general, a radio wave type wireless power supply device that receives microwaves transmitted from power-transmitting antennas at power-receiving antennas and converts the microwaves into power is known.

CITATION LIST

Patent Literature

[Patent Literature 1]
Japanese Patent No. 6012229

SUMMARY OF INVENTION

Technical Problem

Meanwhile, since the wireless power supply device disclosed in Patent Literature 1 adopts the induction power-supplying type, a transmission distance between the power-transmitting coil and the power-receiving coil is short. For this reason, if diameter dimensions and installation positions of both coils are not previously considered in a design stage of the rotating machine, it is difficult to realize proper wireless power transmission.

In the case where the radio wave type wireless power supply device is applied to the rotating machine, the power is transmitted to the plurality of power-receiving antennas that are arranged in rotating bodies in an annular shape, and thus there is a need to arrange numerous power-transmitting patch antennas on the stationary side in an annular shape. In this case, there is a need to perform phase adjustment of each of the patch antennas in order to avoid a reduction in received power of the power-receiving antennas due to interference of radio waves radiated from the patch antennas. For this reason, phase shifters are provided to correspond to the patch antennas, and adjustment should be individually performed. There is possibility that complication of a device and troublesomeness of work are caused.

The present invention is directed to providing a wireless power supply device, a telemetric measuring system, a rotating machine, a system for wirelessly supplying power to a rotating body, and a turbine system, capable of improving a flexibility of installation and inhibiting complication and troublesomeness of work.

Solution to Problem

A wireless power supply device according to a first aspect of the present invention is a wireless power supply device which wirelessly supplies power from a stator side to a plurality of power-receiving antennas disposed on a rotor rotated about an axis at intervals in a circumferential direction, and includes: an oscillator configured to oscillate a high-frequency signal; and an annular power transmitter configured to have a leaky antenna in which a plurality of radiating portions which radiate the high-frequency signal as a radio wave are arranged in the circumferential direction and extend in a circular arc shape in the circumferential direction.

In the present aspect, the radio waves radiated from the leaky antennas acting as the power transmitter are received by the power-receiving antennas, and thereby the power is transmitted to a rotary side. In the case of this antenna type, since a transmission distance is longer than that of induction power-supplying type, a flexibility of installation of power-transmitting antennas and power-receiving antennas can be improved.

Meanwhile, in the present aspect, since the leaky antennas acting as the power transmitter extend in the circumferential direction, the radio waves can be simultaneously radiated to the plurality of power-receiving antennas, which are arranged in the circumferential direction, by one of the leaky antennas. That is, the radio waves can be simultaneously radiated to a group of power-receiving antennas located in a wide range in the circumferential direction by the leaky antennas.

Since the high-frequency signal from one oscillator is propagated to the leaky antenna, by appropriately setting a pitch and sizes of the radiating portions, and thereby the phases of the radio waves radiated from the radiating portions can be properly set. Thereby, it is possible to suppress a reduction in received power of the power-receiving antennas due to the occurrence of fading between the radio waves radiated from the neighboring radiating portions.

Furthermore, as in the case where numerous power-transmitting patch antennas are arranged on a stationary side, there is no need to provide the oscillator for each of the patch antennas. Furthermore, there is no need to adjust the individual phase by installing a transfer device on each of the patch antennas.

In the above aspect, the power transmitter may have an annular shape in which a plurality of leaky antennas including the leaky antenna are arranged in the circumferential direction via a gap between ends thereof in the circumferential direction.

The leaky antennas have a structure in which they are divided in the circumferential direction. Thereby, the power transmitter having an annular shape as a whole can be easily mounted on or demounted from an outer circumferential side of a rotating machine.

In the above aspect, the oscillator may include a plurality of oscillators provided to correspond to the plurality of leaky antennas, and the wireless power supply device may include a reference oscillator that outputs a synchronous signal, which arranges the high-frequency signals which the oscillators oscillate, to the plurality of oscillators.

Even in the case where the power transmitter is made up of the plurality of leaky antennas, the radio waves can be radiated in a wide range by the leaky antennas in the circumferential direction. Thus, in comparison with the case where the numerous patch antennas are arranged, complication of the structure can be avoided. Further, since the phases of the high-frequency signals propagated from the oscillators provided to correspond to the leaky antennas are arranged by the reference oscillator, the power transmitter can radiate uniform radio waves as a whole. Thereby, the fading can be inhibited to avoid reducing the received power.

In the above aspect, the wireless power supply device may include a power divider that distributes the high-frequency signal which the oscillator oscillates to the leaky antennas.

In the case, as described above, the high-frequency signal having the same phase is propagated to each of the leaky antennas. For this reason, the power transmitter can radiate uniform radio waves as a whole, and the fading can be inhibited.

In the above aspect, the wireless power supply device may include a phase shifter that enables adjustment of a phase of the high-frequency signal distributed to the leaky antennas by the power divider.

Thereby, fine adjustment of the phase of the radio wave radiated from each of the leaky antennas can be performed, and the phases of the radio waves from the leaky antennas can be identical to each other with higher accuracy.

Further, the phase adjustment is performed by the phase shifter while looking at the received power of each of the power-receiving antennas. Thereby, for example, even in the case where wire lengths between the power divider and the leaky antennas or dimensions of the leaky antennas in the circumferential direction are different, a phase difference between the radio waves radiated from the leaky antennas can be made smaller.

In the above aspect, the wireless power supply device may include a dielectric lens that covers at least some of the radiating portions.

Thereby, foreign materials can be inhibited from entering the radiating portions of the leaky antennas. Therefore, characteristic deterioration of the leaky antennas caused by the foreign materials can be avoided.

Further, directionality of the radio waves can be arbitrarily set by the dielectric lens. Accordingly, a flexibility of installation of the power transmitter and the power-receiving antennas can be further improved.

In the above aspect, the leaky antenna is preferably a leaky waveguide.

Since the leaky waveguide generally has high heat resistance, the leaky antenna can also be installed under a higher temperature environment. Therefore, the flexibility of installation can be further improved.

A telemetric measuring system according to a second aspect of the present invention includes: a stator-side unit configured to have any one of the wireless power supply devices and a receiver that is provided on the stator side and receives wireless information; and a plurality of rotor-side units configured to have a power-receiving module that includes the power-receiving antennas, sensors that are driven by power which the power-receiving antennas receive and that detect a state of the rotor, and transmitters that are driven by the power which the power-receiving antennas receive and that transmit detected signals of the sensors as wireless information, and provided on the rotor at intervals in the circumferential direction.

A rotating machine according to a third aspect of the present invention includes: the stator; the rotor configured to have a rotary shaft that is rotated about the axis relative to the stator, and a plurality of blades that are provided to radially extend from an outer circumferential surface of the rotary shaft; and the telemetric measuring system. The sensors are provided on the respective blades.

A wireless power-supplying system according to a fourth aspect of the present invention has the following features.

1) The wireless power-supplying system is a system for wirelessly supplying power to a rotating body, which supplies driving power to transmitters, each of which is arranged in the rotating body, from a plurality of oscillators via power-transmitting antennas arranged in an annular shape.

The oscillators are arranged to correspond to the power-transmitting antennas in an annular shape, and drive the oscillators, which are adjacent to a single reference oscillator driven first by an oscillating trigger signal in counterclockwise and clockwise directions, through the oscillating trigger signal sent from the reference oscillator, and sequentially drive the oscillator adjacent in the counterclockwise direction and the oscillator adjacent in the clockwise direction through oscillating trigger signals that are sent from the oscillator adjacent in the clockwise direction and the oscillator adjacent in the counterclockwise direction to the respective oscillators.

The power-transmitting antennas are connected to the oscillators by wires having the same length.

2) In the feature (1), the oscillators are arranged in an even number except the reference oscillator.

3) In the feature (1) or (2), the transmitters are arranged in blades of a turbine.

A turbine system having the wireless power-supplying system according to a fifth aspect of the present invention has the following features.

4) In the turbine system having an operation monitoring system configured to have sensors that are arranged in blades of a turbine and detect predetermined physical amounts including strains and temperatures of the blades, and transmitters that are arranged in the blades, input detected signals that represent the physical amounts which the sensors have detected, and wirelessly transmit the detected signals toward receivers of a stationary side, the system for wirelessly supplying power to a rotating body defined in the feature (3) is applied as a wireless power-supplying system that supplies driving power of the transmitters.

In the fourth and fifth aspects, the received power based on the radio waves received by the power-receiving module is almost dominantly determined depending on an arrival radio wave from the front power-transmitting antenna that directly faces the power-receiving module and arrival radio waves from the power-transmitting antennas adjacent to the directly facing power-transmitting antenna in the counterclockwise and clockwise directions.

Here, in the wireless power-supplying system according to the above aspect, the oscillators and the power-transmitting antennas are connected by the wires having the same length. In addition, the oscillators, the power-transmitting antennas, and the wires are all arranged in an annular shape with the same layout. As a result, the phase difference of the radio waves caused by a difference between the wire lengths does not occur. Therefore, the phase shifters provided on the wireless power-supplying system of the related art can be removed. Further, the oscillating trigger signals are sequentially sent from the single oscillator becoming the reference to the oscillators adjacent to the reference oscillator in the counterclockwise and clockwise directions, and drive the oscillators. As a result, the wire for transmitting the oscillating trigger signal can be shortened as much as possible. In combination with the fact that the phase shifters can be removed, miniaturization of the device of the stationary side and a reduction in cost can be realized.

Advantageous Effects of Invention

According to the wireless power supply device, the telemetric measuring system, the rotating machine, the system for wirelessly supplying power to a rotating body, and the turbine system of the present invention, a flexibility of installation can be improved, and complication and troublesomeness of work can be inhibited.

DESCRIPTION OF EMBODIMENTS

Hereinafter, a first embodiment of the present invention will be described with reference to FIGS. 1 to 4.

Figure 1:
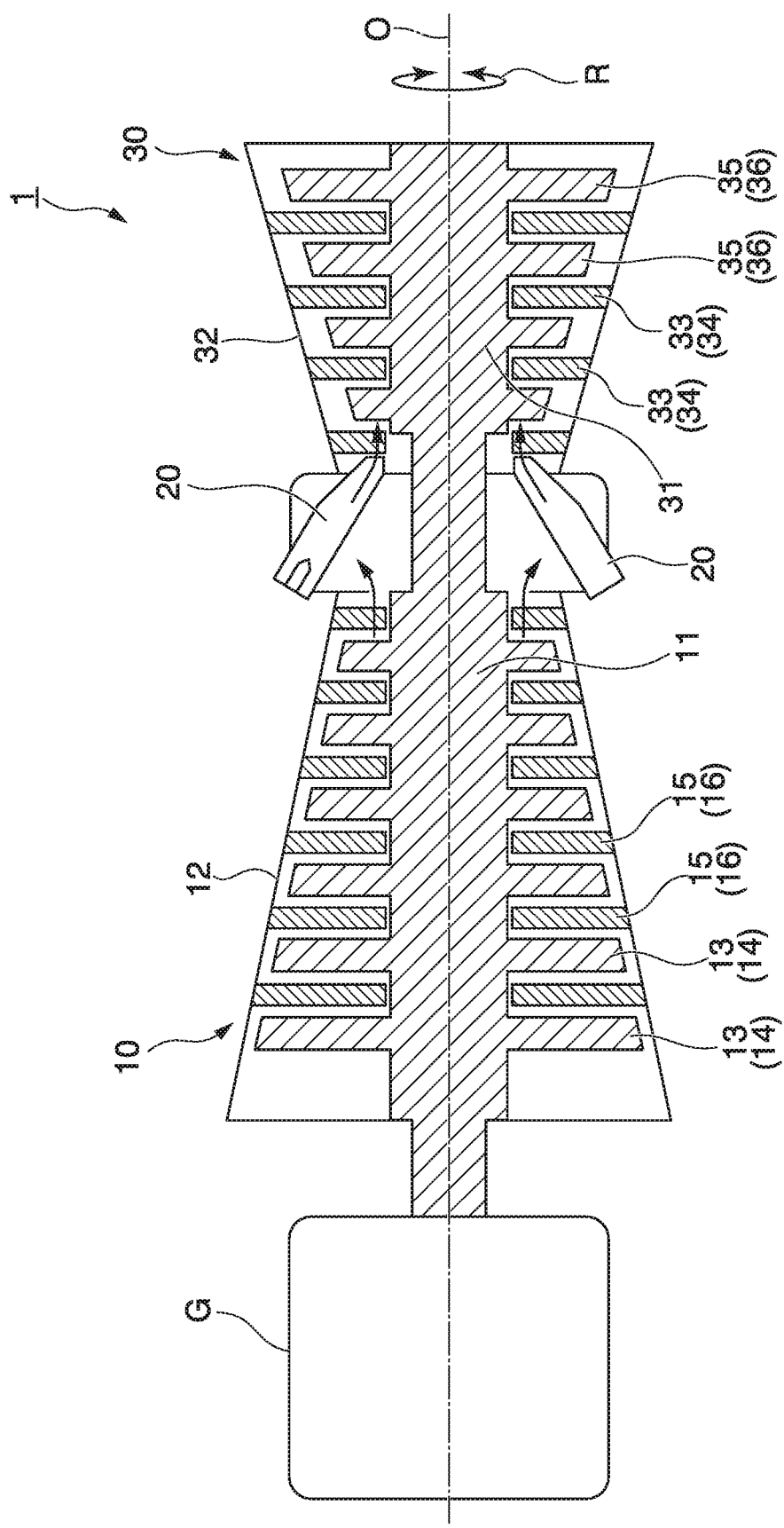
FIG. 1 is a schematic longitudinal sectional view of a gas turbine according to a first embodiment.

As illustrated in FIG. 1, a gas turbine 1 according to the present embodiment includes a compressor 10 that generates high-pressure air, a combustor 20 that mixes fuel with high-pressure air, burns the mixture, and thereby generates a combustion gas, and a turbine 30 that is driven by the combustion gas.

The compressor 10 has a compressor rotor 11 that rotates about an axis O and a compressor casing 12 that covers the compressor rotor 11 from an outer circumferential side. The compressor rotor 11 has a pillar shape that extends along the axis O. A plurality of compressor blade rows 13 arranged at intervals in a direction of the axis O are provided on an outer circumferential surface of the compressor rotor 11. Each of the compressor blade rows 13 has a plurality of compressor blades 14 that are arranged on the outer circumferential surface of the compressor rotor 11 at intervals in a circumferential direction of the axis O.

The compressor casing 12 has a tubular shape centered on the axis O. A plurality of compressor vane rows 15 arranged at intervals in the direction of the axis O are provided on an inner circumferential surface of the compressor casing 12. These compressor vane rows 15 are arranged to alternate with the compressor blade rows 13 when viewed in the direction of the axis O. Each of the compressor vane rows 15 has a plurality of compressor vanes 16 that are arranged on the inner circumferential surface of the compressor casing 12 at intervals in the circumferential direction of the axis O.

The combustor 20 is provided between the compressor casing 12 and a turbine casing 32 (to be described below). The high-pressure air generated by the compressor 10 is mixed with the fuel in the combustor 20, and becomes a premixed gas. The premixed gas is burned in the combustor 20, and thereby a high-temperature high-pressure combustion gas is generated. The combustion gas is guided into the turbine casing 32, and drives the turbine 30.

The turbine 30 has a turbine rotor 31 that rotates about the axis O and the turbine casing 32 that covers the turbine rotor 31 from an outer circumferential side. A plurality of turbine disks 31a (see FIG. 2) that have disk shapes centered on the axis are stacked in a direction of the axis O, and thereby the turbine rotor 31 has a pillar shape that extends along the axis O as a whole. A turbine blade row 33 is provided on an outer circumference of each of the turbine disks 31a. Thereby, a plurality of turbine blade rows 33 arranged at intervals in the direction of the axis O are provided on the turbine rotor 31.

Each of the turbine blade rows 33 has a plurality of turbine blades 34 that are arranged on an outer circumferential surface of the turbine rotor 31 at intervals in the circumferential direction of the axis O. The turbine rotor 31 is integrally connected to the compressor rotor 11 in the direction of the axis O, and thereby forms a gas turbine rotor.

The turbine casing 32 has a tubular shape centered on the axis O. A plurality of turbine vane rows 35 arranged at intervals in the direction of the axis O are provided on an inner circumferential surface of the turbine casing 32. These turbine vane rows 35 are arranged to alternate with the turbine blade rows 33 when viewed in the direction of the axis O. Each of the turbine vane rows 35 has a plurality of turbine vanes 36 that are arranged on the inner circumferential surface of the turbine casing 32 at intervals in the circumferential direction of the axis O. The turbine casing 32 is connected to the compressor casing 12 in the direction of the axis O, and thereby forms a gas turbine casing. That is, the gas turbine rotor is made integrally rotatable about the axis O in the gas turbine casing.

Figure 2:
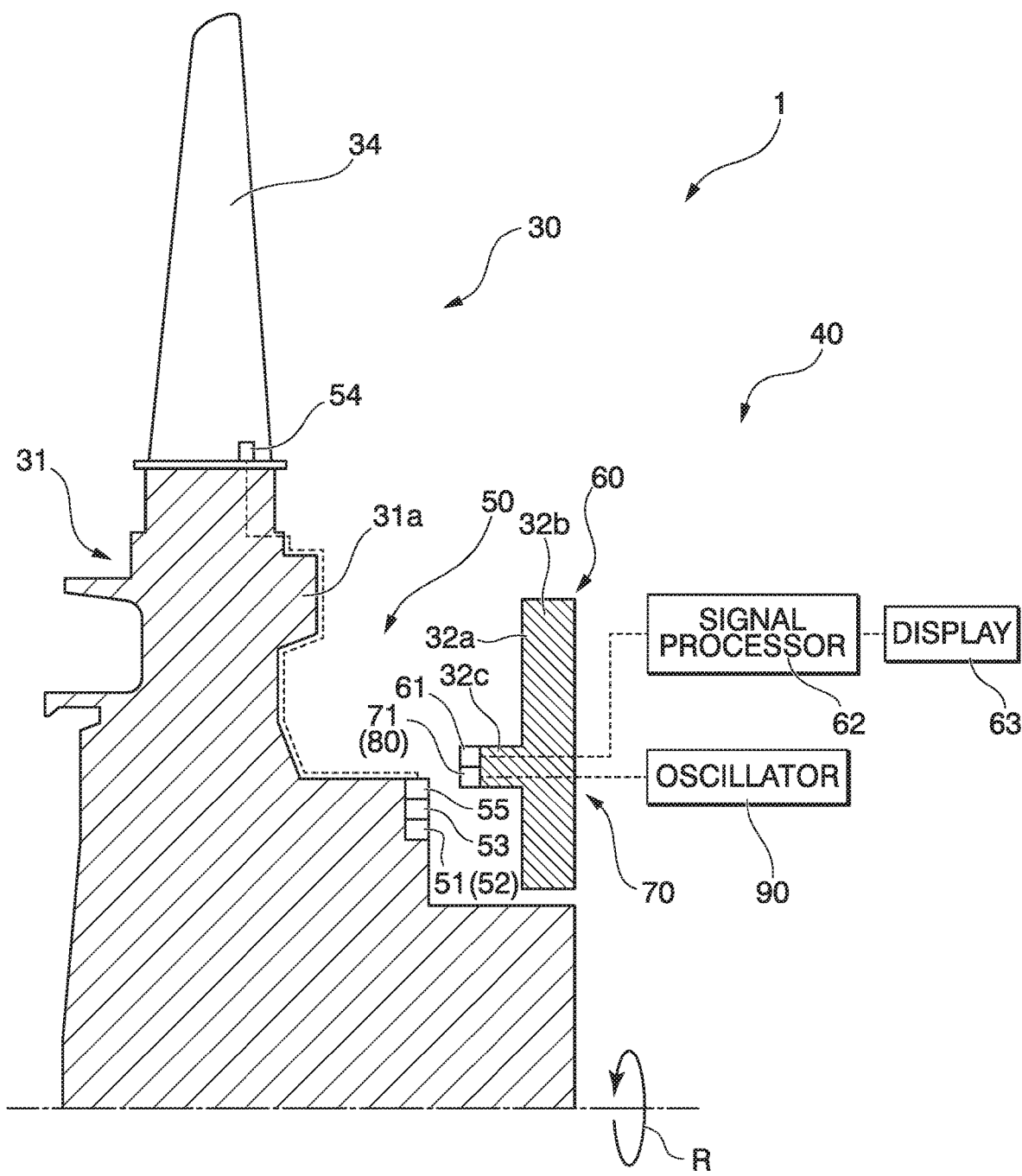
FIG. 2 is a longitudinal sectional view illustrating a schematic constitution of a telemetric measuring system according to a first embodiment.

Here, the present embodiment includes a telemetric measuring system 40 for monitoring an operation situation of the gas turbine 1 in operation. As illustrated in FIG. 2, the telemetric measuring system 40 includes a rotor-side unit 50 and a stator-side unit 60.

The rotor-side unit 50 is integrally provided on the turbine rotor 31 of the gas turbine 1, and is rotated about the axis O in association with the rotation of the turbine rotor 31. The rotor-side unit 50 has a power-receiving module 51, a secondary battery 53, a sensor 54, and a transmitter 55. The power-receiving module 51, the secondary battery 53, the sensor 54, and the transmitter 55 are set as one set, and the rotor-side unit 50 has a plurality of sets.

The power-receiving modules 51 have power-receiving antennas 52 that receive power transmitted as radio waves (microwaves) from the outside. The plurality of power-receiving antennas 52 are provided on a surface facing one side (on a right side in FIG. 2 or a downstream side of the turbine) of the turbine disk 31a in the direction of the axis O to be exposed from an outer surface of the turbine disk 31a at intervals in a circumferential direction. The plurality of power-receiving modules 51 may be provided, for example, to correspond to the turbine blades 34 at intervals at a predetermined angle in a circumferential direction. The radio waves received by the power-receiving antennas 52 are converted into power in the power-receiving modules 51.

The plurality of secondary batteries 53 are provided to correspond to the plurality of power-receiving modules 51. Each of the secondary batteries 53 is provided integrally with one of the power-receiving modules 51. The secondary batteries 53 are electrically connected to the corresponding power-receiving modules 51 and are charged by power which the power-receiving modules 51 have received. The secondary batteries 53 supply power for driving the sensors 54 and the transmitters 55 to them. That is, in the present embodiment, the power which the power-receiving modules 51 have received is supplied to the sensors 54 and the transmitters 55 via the secondary batteries 53.

The plurality of sensors 54 are provided on the turbine disk 31a at intervals in a circumferential direction, and are mounted on the turbine blades 34 in the present embodiment. For example, strain gauges that detect vibrations of the turbine blades 34 or thermocouples that detect temperatures of the turbine blades 34 are used as the sensors 54. Any other sensors 54 capable of detecting physical quantities of the turbine blades 34 in an operation state of the gas turbine 1 may be used. These sensors 54 are electrically connected to the corresponding sets of secondary batteries 53, and power for driving the sensors 54 is supplied from the secondary batteries 53.

The plurality of transmitters 55 are provided to correspond to the power-receiving modules 51 and the secondary batteries 53 at intervals in a circumferential direction. The power-receiving antennas 52 are provided on the surface facing the one side (on the right side in FIG. 2 or the downstream side of the turbine) of the turbine disk 31a in the direction of the axis O to be exposed from the outer surface of the turbine disk 31a. One set of a transmitter 55, a power-receiving module 51, and a secondary battery 53 is integrally provided. The transmitter 55 is electrically connected to the secondary battery 53 and the sensor 54. The transmitter 55 is driven by power supplied from the secondary battery 53. A detected signal detected by the corresponding sensor 54 is input to the transmitter 55. The transmitter 55 converts the detected signal of the sensor 54 into wireless information, and transmits the wireless information to the outside via a transmitting antenna.

Next, the stator-side unit 60 will be described. The stator-side unit 60 has a receiver 61, a signal processor 62, a display 63, and a wireless power supply device 70. The receiver 61 of the stator-side unit 60 is provided on a stationary component (a stator) 32a.

Here, the stationary component 32a is a component that is stationary and does not rotate relative to the turbine rotor 31 rotated about the axis O, and is fixed, for example, to the turbine casing 32 in the present embodiment. The stationary component 32a may be not only fixed to the turbine casing 32 but be mounted on a stationary structure.

The stationary component 32a has a stationary component main body 32b formed in a discoid shape that faces a surface of the turbine disk 31a on which the power-receiving modules 51 and the power-receiving antennas 52 of the rotor-side unit 50 are provided, from one side of the axis O. The turbine rotor 31 passes through the stationary component main body 32b in the direction of the axis O. The stationary component 32a has protrusions 32c that protrude from the stationary component main body 32b toward the turbine disk 31a, that is, toward the one side (on the right side in FIG. 2 or an upstream side of the turbine 30) in the direction of the axis O. The plurality of protrusions 32c are provided at intervals in a circumferential direction. Tips of the protrusions 32c are disposed at an interval from and in the vicinity of the power-receiving modules 51 and the transmitters 55 of the rotor-side unit 50.

The receiver 61 is provided on the protrusion 32c of the stationary component 32a, and has a receiving antenna that receives the wireless information transmitted by the transmitter 55 of the rotor-side unit 50. The receiving antenna may be provided on the protrusion 32c of the stationary component 32a, or may be provided to extend in the circumferential direction using the protrusion 32c as a fixing place. The receiver 61 is disposed on one side in the direction of the axis O and outside in a radial direction at an interval from the transmitter 55. That is, the receiver 61 faces the transmitter 55 in a direction inclined with respect to the direction of the axis O.

The wireless information received by the receiver 61 is input to the signal processor 62. The signal processor 62 extracts the detected signal of the sensor 54 which is included in the wireless information.

The display 63 displays the detected signal of the sensor 54 which is extracted by the signal processor 62, for example, such that an administrator of the gas turbine 1 can check the detected signal.

The signal processor 62 and the display 63 may be provided outside the gas turbine 1.

Figure 3:
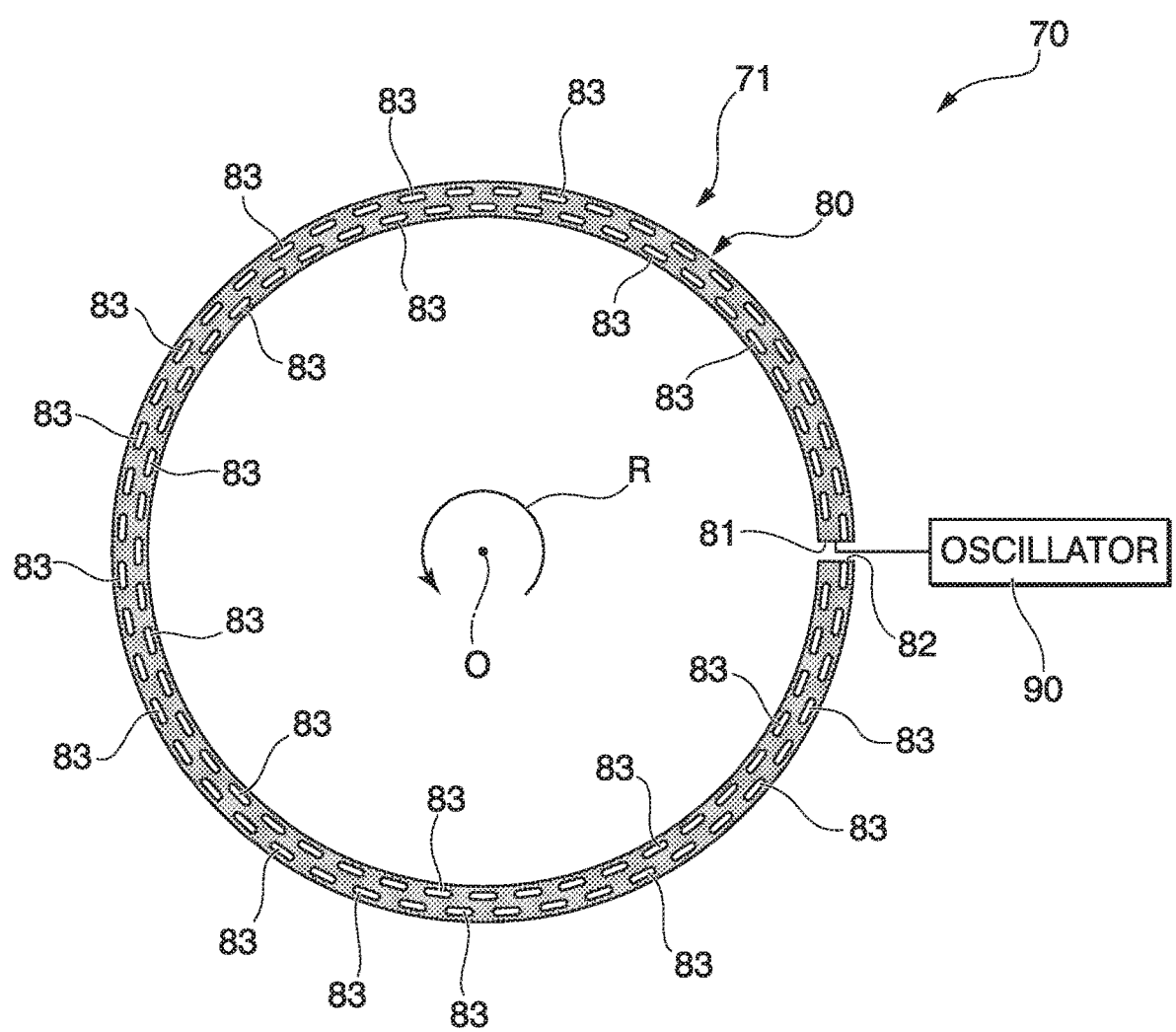
FIG. 3 is a schematic constitution view of a wireless power supply device according to a first embodiment.

Next, the wireless power supply device 70 will be described using FIGS. 2 and 3. The wireless power supply device 70 wirelessly supplies power to the plurality of power-receiving antennas 52 disposed on the turbine rotor 31 at intervals in a circumferential direction from the vicinity of the stationary component 32a.

The wireless power supply device 70 has a power transmitter 71 and an oscillator 90.

The power transmitter 71 has an annular shape centered on the axis O as a whole. The power transmitter 71 is fixed to the stationary component 32a. In the present embodiment, the power transmitter 71 is constituted of a leaky waveguide (a leaky antenna) 80.

The leaky waveguide 80 extends in a circumferential direction and along a circular arc centered on the axis O. The leaky waveguide 80 has an inside formed in a hollow shape, and a cross-sectional shape thereof perpendicular to an extending direction is, for example, a rectangular shape or a circular shape. A first end 81 that is one end of the leaky waveguide 80 in the circumferential direction and a second end 82 that is the other end of the leaky waveguide 80 in the circumferential direction face each other with a slight gap. That is, the leaky waveguide 80 is curved to have a C shape, and has an annular shape that surrounds the axis O on the entire circumference excluding the gap.

The leaky waveguide 80 is fixed to the tips of the plurality of protrusions 32c of the stationary component 32a. That is, the leaky waveguide 80 uses the protrusions 32c as fixing places while sequentially going by way of the protrusions 32c disposed at intervals in the circumferential direction. As illustrated in FIG. 2, the leaky waveguide 80 is located on one side in the direction of the axis O and the outside in the radial direction with respect to the power-receiving antennas 52 that are arranged in the rotor-side unit 50 in an annular shape. That is, the leaky waveguide 80 faces the power-receiving antennas 52 in a direction inclined with respect to the direction of the axis O.

A plurality of radiating portions 83 passing through the leaky waveguide 80 are mutually arranged on a surface which faces sides of the power-receiving antennas 52 in the leaky waveguide 80, for example, a surface on the other side in the direction of the axis O, at an interval.

Figure 4:
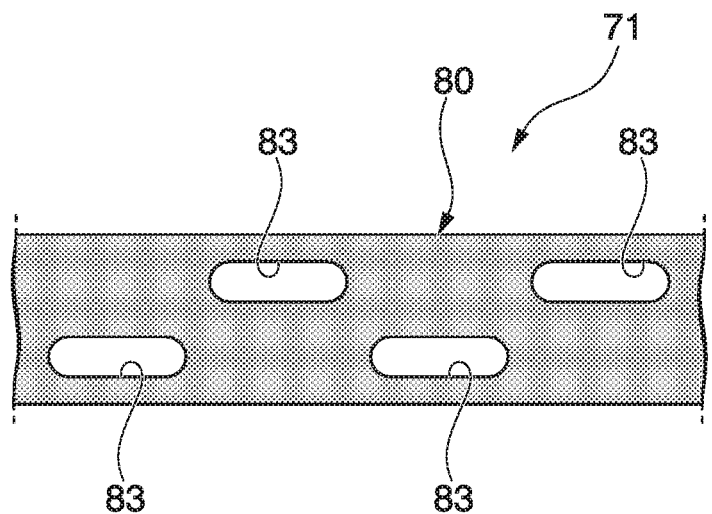
FIG. 4 is a view illustrating an example of an arrangement mode of radiating portions of a leaky waveguide of the wireless power supply device according to the first embodiment.

In the present embodiment, in detail, as illustrated in FIG. 4, the radiating portions 83 that extend in the circumferential direction that is a longitudinal direction are alternately arranged at inner and outer portions of the leaky waveguide 80 in a radial direction in a zigzag shape as they are directed in the circumferential direction.

The oscillator 90 oscillates a high-frequency signal having a predetermined frequency depending on power supplied from a power supply (not shown). The oscillator 90 is electrically connected to the first end 81 of the leaky waveguide 80 via a wire. The high-frequency signal which the oscillator 90 has oscillated is transmitted to the first end 81 of the leaky waveguide 80, and thereby electromagnetic waves are propagated from the side of the first end 81 toward the side of the second end 82 in the leaky waveguide 80 while forming an electromagnetic field. Radio waves (microwaves) of phases corresponding to the formation places of the radiating portions 83 are radiated from the radiating portions 83 on the basis of the electromagnetic waves.

Next, effects of the present embodiment will be described.

During the operation of the gas turbine 1 in which the turbine rotor 31 is in a rotated state, the sensors 54 mounted on the turbine blades 34 are driven by the power from the secondary batteries 53, and thereby the detected signals of the sensors 54 are output to the transmitters 55. The transmitters 55 are driven by the power from the secondary batteries 53, and thereby the detected signals are converted into wireless information and are transmitted to the transmitters 55 of the stator-side unit 60. The signal processor 62 extracts the detected signals of the sensors 54 from the wireless information which the transmitters 55 have received, and the detected signals are displayed on the display 63. On the basis of the displayed signals, an administrator of the gas turbine 1 determines normality or abnormality of the operation state of the gas turbine 1.

Concurrently with the state detection of the turbine blades 34, the power is wirelessly transmitted from the wireless power supply device 70 of the stator-side unit 60 to the power-receiving antennas 52 of the rotor-side unit 50, and the secondary batteries 53 are charged.

That is, the high-frequency signal which the oscillator 90 of the wireless power supply device 70 has oscillated is propagated into the leaky waveguide 80 as electromagnetic waves, and the radio waves from the radiating portions 83 are radiated. Since the radiating portions 83 are formed on the entire area of the leaky waveguide 80 in the circumferential direction, the radio waves are radiated from the entire area in the circumferential direction. The radio waves radiated in this way are received by the power-receiving antennas 52 of the power-receiving modules 51 rotated about the axis O in a rotational direction R. The power-receiving antennas 52 sequentially receive the radio waves radiated from the radiating portions 83 in the process of moving in the circumferential direction during rotation. That is, the power-receiving antennas 52 sequentially receive the radio waves from the radiating portions 83 of the leaky waveguide 80 in the entire area in the circumferential direction. The radio waves which the power-receiving antennas 52 have received are converted into the power by the power-receiving modules 51, and the power is supplied to the secondary batteries 53. Thereby, the secondary batteries 53 are charged with the power for driving the sensor 54 and the transmitter 55.

As described above, the present embodiment adopts antenna type wireless power transmission in which the power is transmitted to the rotary side by receiving the radio waves radiated from the leaky waveguide 80 as the power transmitter 71 at the power-receiving antennas 52. The antenna type has a longer transmission distance than an induction power-supplying type that transmits energy via a coil, for example, on the rotary side and the stationary side.

Here, in the case where the induction power-supplying type having a short transmission distance is adopted, there is a need to previously consider the diameter or the installation position of the coil in the design stage of the gas turbine 1 to perform the wireless power transmission on the rotary and stationary sides of the gas turbine 1. For this reason, there is a problem in that the power-supplying device of the induction power-supplying type cannot be retrofitted.

In contrast, in the present embodiment, since the antenna type is adopted, even if the transmission distance is relatively long, the power can be sufficiently transmitted from the stationary side to the rotary side. For this reason, the wireless power supply device 70 can also be retrofitted to the gas turbine 1 in addition to enabling an improvement in a flexibility of design.

In the present embodiment, since the single leaky waveguide 80 acting as the power transmitter 71 extends in an annular shape in the circumferential direction, the radio waves can be simultaneously radiated to the plurality of power-receiving antennas 52 arranged in the circumferential direction by the single leaky waveguide 80. That is, the radio waves can be simultaneously radiated to a group of the power-receiving antennas 52 located in a wide range in the circumferential direction by the single leaky waveguide 80.

Furthermore, since the high-frequency signal from the single oscillator 90 is propagated to the leaky waveguide 80, by appropriately setting a pitch and size of the radiating portions 83, and the phases of the radio waves radiated from the radiating portions 83 can be arranged. Thereby, it is possible to suppress a reduction in received power of the power-receiving antennas 52 due to the occurrence of fading between the radio waves radiated from the neighboring radiating portions 83.

Here, for example, in the case where an attempt is made to transmit the power to the rotary side using patch antennas instead of the leaky waveguide 80, there is a need to arrange numerous patch antennas at a pitch of a half wavelength in the circumferential direction to arrange the phases of the patch antennas. Furthermore, there is a need to install a transfer device on each of the patch antennas to adjust the phase radiated from each of the patch antennas.

In contrast, in the present embodiment, since the single leaky waveguide 80 serves as the numerous patch antennas, a structure can be simplified, and costs can be reduced. Furthermore, since the phases of the radio waves radiated from the radiating portions 83 can be arranged by adequately setting the formation places (the pitch) and shapes of the radiating portions 83, there is no need to individually install the transfer devices to perform the phase adjustment. For this reason, complication of the device and troublesome work can be avoided.

Since the leaky waveguide 80 generally has higher heat resistance than the patch antennas or the induction power-supplying type coil, the leaky waveguide 80 can also be installed, for example, in a place where the turbine 30 has a relatively high temperature. Therefore, the flexibility of design can be more greatly secured.

In particular, the gas turbine 1 is designed such that power generation efficiency is maximized. If the flexibility of design of the wireless power supply device 70 is high, the wireless power supply device 70 can be installed without impairing an original design of the gas turbine 1 to that extent. For this reason, the wireless power supply device 70 can be installed with high flexibility while assuring an original function as the gas turbine 1.

Figure 5:
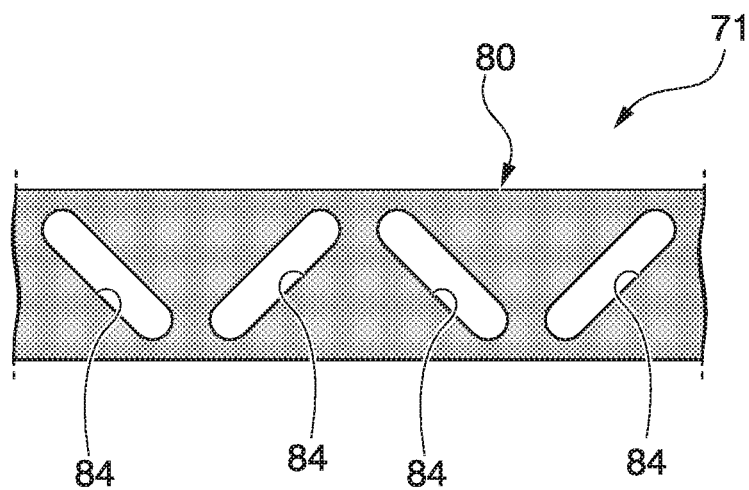
FIG. 5 is a view illustrating an example of an arrangement mode of radiating portions of a leaky waveguide of a wireless power supply device according to a modification of the first embodiment.

As illustrated in FIG. 5, for example, radiating portions 84 may be formed as a modification of the first embodiment.

That is, in the modification, each of the radiating portions 84 sets an oblique direction which is a direction directed radially toward the circumferential direction as a longitudinal direction. To be more specific, one of the radiating portions 84 extends outward in the radial direction toward one side in the circumferential direction, and the other radiating portions 84 adjacent to the radiating portion 84 on one side in the circumferential direction extend inward in the radial direction toward one side in the circumferential direction. In this modification, the plurality of radiating portions 84 are arranged to extend in a zigzag shape.

Thus, by appropriately setting a pitch and shapes of the radiating portions 84, and thereby phases of radio waves radiated from the radiating portions 84 can be arranged. Thereby, the radio waves radiated from the plurality of radiating portions 84 are inhibited from interfering with one another, and a high level of received power at the power-receiving antenna 52 can be maintained.

Figure 6:
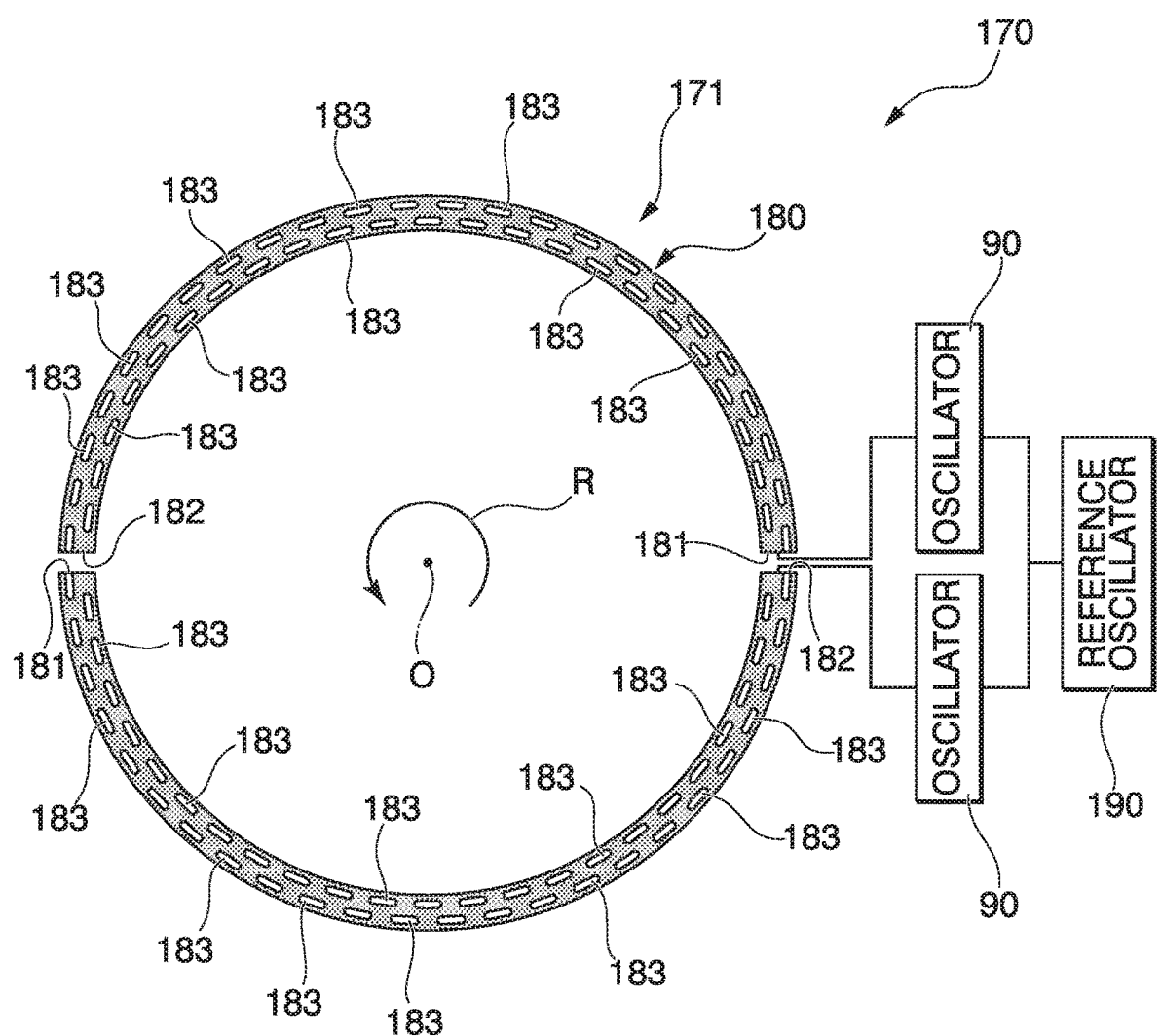
FIG. 6 is a schematic constitution view of a wireless power supply device according to a second embodiment.

Next, a second embodiment of the present invention will be described with reference to FIG. 6. In FIG. 6, the same reference signs are given to components that are identical or similar to those of the first embodiment, and detailed description will be omitted.

A wireless power supply device 170 of the second embodiment includes a power transmitter 171, a plurality of oscillators 90, and a reference oscillator 190.

The power transmitter 171 of the second embodiment has a plurality of leaky waveguides 180 (two leaky waveguides 180 in the present embodiment). These leaky waveguides 180 extend in the circumferential direction and along a circular arc centered on the axis O. In the present embodiment, each of the leaky waveguides 180 extends in a range of about 180° centered on the axis O. Dimensions of the two leaky waveguides 180 in the circumferential direction are the same.

The two leaky waveguides 180 are arranged in the circumferential direction via a gap between ends thereof in the circumferential direction. To be more specific, a first end 181 of one of the leaky waveguides 180 faces a second end 182 of the other leaky waveguide 180 via a slight gap in the circumferential direction. A first end 181 of the other leaky waveguide 180 faces a second end 182 of the one leaky waveguide 180 via a slight gap in the circumferential direction. Thereby, the power transmitter 171 has an annular shape centered on the axis O as a whole.

In the present embodiment, the plurality of oscillators 90 (two oscillators 90 in the present embodiment) are provided to correspond to the plurality of leaky waveguides 180. The oscillators 90 are connected to the corresponding leaky waveguides 180 via wires. In the present embodiment, one of the oscillators 90 is connected to the first end 181 of the one leaky waveguide 180 via the wire. The other oscillator 90 is connected to the second end 182 of the other leaky waveguide 180 via the wire. Lengths of the wires are preferably the same.

The reference oscillator 190 is electrically connected to each oscillators 90. The reference oscillator 190 outputs a synchronization signal as an oscillating trigger to the oscillators 90 such that high-frequency signals which the oscillators 90 have oscillated are identical to each other. Each of the oscillators 90 oscillates the high-frequency signal on the basis of the synchronization signal between the different oscillators 90 such that frequencies are identical to each other and phases are match each other.

The wireless power supply device 170 of the second embodiment has a structure in which the leaky waveguides 180 constituting the power transmitter 171 are divided into the plurality of leaky waveguides 180 in the circumferential direction. For this reason, the power transmitter 71 formed in an annular shape as a whole can be easily mounted on or demounted from an outer circumferential side of the turbine 30. Therefore, in addition to facilitating production and assembly, mounting/demounting work during maintenance can be easily performed.

In this way, even in the case where the power transmitter 71 is made up of the plurality of leaky waveguides 180, the radio waves can be radiated in a wide range (in a range of 180° in the present embodiment) in the circumferential direction by the numerous radiating portions 83 of each of the leaky waveguides 180. Accordingly, in comparison with the case where the numerous patch antennas are arranged, complication of the structure can be avoided.

Furthermore, since the frequencies and phases of the high-frequency signals propagated from the oscillators 90 provided to correspond to the leaky waveguides 180 are arranged by the reference oscillator 190, the power transmitter 171 can radiate uniform radio waves as a whole. Thereby, fading can be inhibited to avoid reducing the received power.

Figure 7:
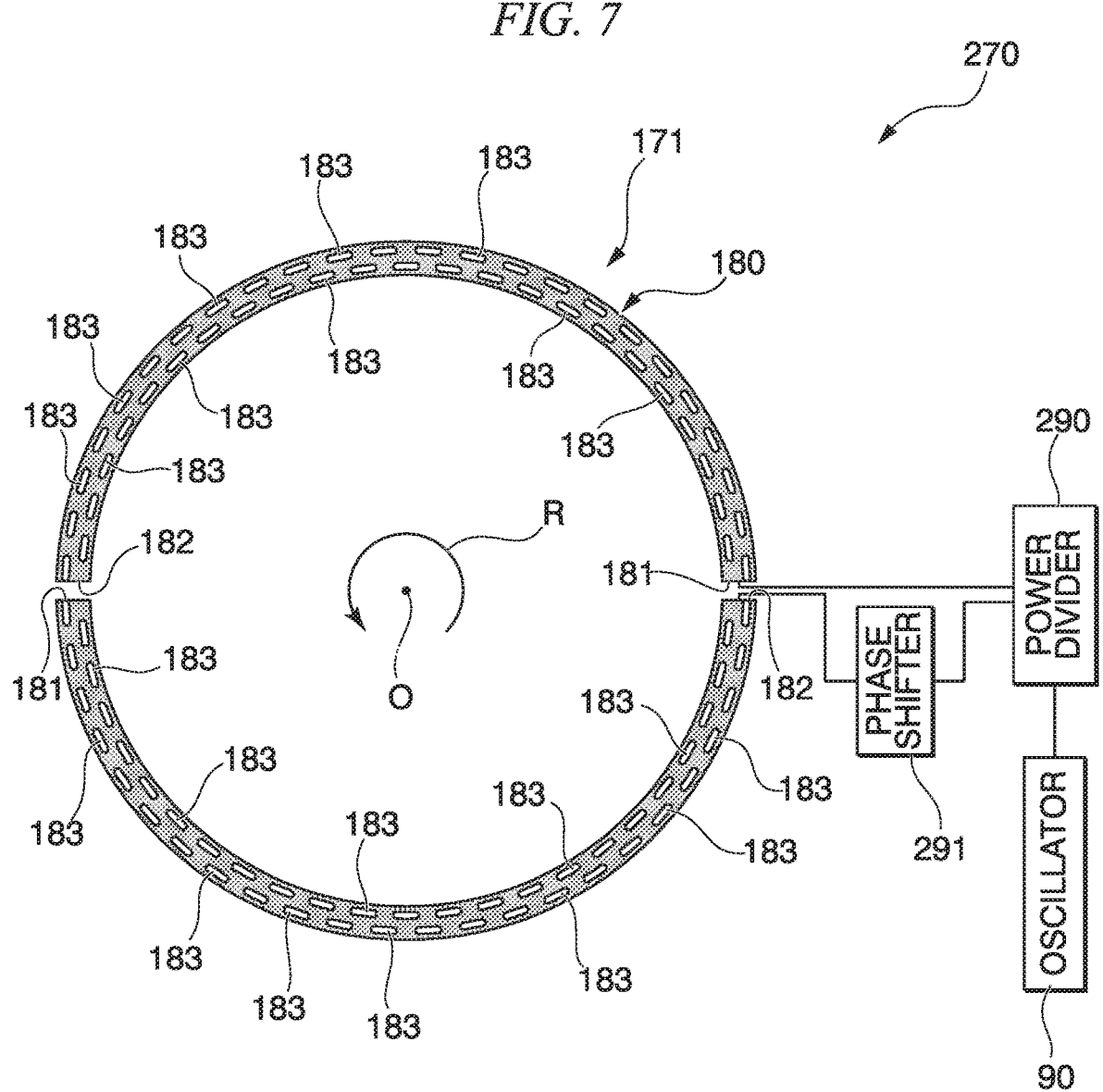
FIG. 7 is a schematic constitution view of a wireless power supply device according to a third embodiment.

Next, a third embodiment of the present invention will be described with reference to FIG. 7. In FIG. 7, the same reference signs are given to components that are identical or similar to those of the second embodiment, and detailed description will be omitted.

A wireless power supply device 270 of the third embodiment includes a power transmitter 171, an oscillator 90, a power divider 290, and a phase shifter 291.

In the present embodiment, only one oscillator 90 is provided. The power divider 290 is interposed between the oscillator 90 and a plurality of leaky waveguides 180 (two leaky waveguides 180 in the present embodiment).

The power divider 290 distributes a high-frequency signal which the oscillator 90 has oscillated to leaky antennas. The power divider 290 and a first end 181 of one of the leaky waveguides 180 are directly and electrically connected by a wire. The power divider 290 and a second end 182 of the other leaky waveguide 180 are connected by a wire, but the phase shifter 291 is installed in the middle of the wire.

In the present embodiment, due to the constitution in which the high-frequency signal from the single oscillator 90 is propagated to the leaky waveguides 80 by the power divider 290, the high-frequency signal having the same phase is propagated to each of the leaky antennas. For this reason, the power transmitter 171 can radiate uniform radio waves as a whole, and inhibit fading.

Furthermore, since the phase shifter 291 is interposed between the other leaky waveguide 180 and the power divider 290, fine adjustment of the phases of the radio waves radiated from the other leaky waveguide 180 can be performed.

In particular, since a second end 182 of the one leaky waveguide 180 and a first end 181 of the other leaky waveguide 180 are separated from a place where the high-frequency signal is transmitted, the fading occurs easily. For example, in the case where dimensions of the two leaky waveguides 180 in the circumferential direction are different, or in the case where lengths of the wires for transmitting the high-frequency signal to the two leaky waveguides 80 are different, the fading may occur in that place.

In the present embodiment, for example, the phase adjustment is performed by the phase shifter 291 while looking at the received power of each of the power-receiving antennas 52. Thereby, a phase difference between the radio waves radiated from the leaky waveguides 180 can be made smaller, and the occurrence of the fading can be further inhibited.

Figure 8:
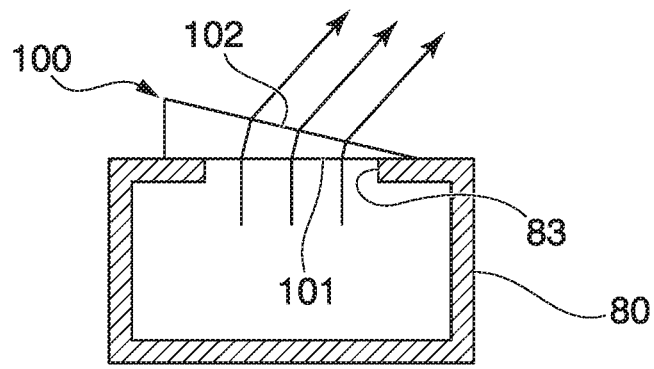
FIG. 8 is a sectional view orthogonal to a leaky waveguide and a dielectric lens of a wireless power supply device according to a fourth embodiment in a circumferential direction.

Next, a fourth embodiment of the present invention will be described with reference to FIG. 8. In FIG. 8, the same reference signs are given to components that are identical or similar to those of the first embodiment, and detailed description will be omitted.

In a leaky waveguide 80 of the fourth embodiment, a dielectric lens 100 is provided on each of radiating portions 83. The dielectric lens 100 is formed of, for example, a resin such as polytetrafluoroethylene.

The dielectric lens 100 has an incidence plane 101 that blocks the radiating portion 83, and an emission plane 102 that is connected to the incidence plane 101 and is inclined with respect to the incidence plane 101.

Because the dielectric lenses 100 are provided, the dielectric lenses 100 serve as covers of the radiating portions 83. For this reason, foreign materials can be inhibited from entering the leaky waveguides 80 from the outside via the radiating portions 83. Thereby, characteristic deterioration of the leaky waveguides 80 caused by foreign materials can be avoided.

Since the dielectric lenses 100 transmit the radio waves radiated from the radiating portions 83, they do not hinder the wireless power transmission. As in the present embodiment, the incidence plane 101 upon which the radio waves are incident is made to intersect the emission plane 102 to which the radio waves are emitted, and thereby the radio waves can be emitted in an arbitrary direction depending on an angle at which the incidence plane 101 intersects the emission plane 102. Therefore, directionality of the radio waves can be changed arbitrarily, and a flexibility of installation of the wireless power supply device 70 can be further improved.

Figure 9:
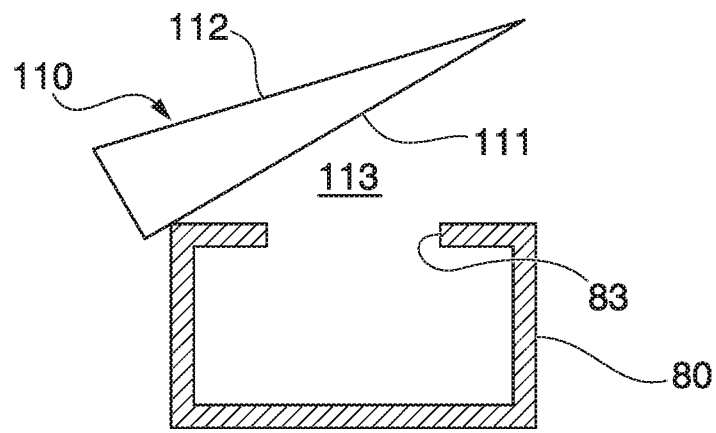
FIG. 9 is a sectional view orthogonal to a leaky waveguide and a dielectric lens of a wireless power supply device according to a first modification of the fourth embodiment in a circumferential direction.

As a first modification of the fourth embodiment, as illustrated, for example, in FIG. 9, an incidence plane 111 of a dielectric lens 110 having the incidence plane 111 and an emission plane 112 may be separated outward from a radiating portion 83, and an air layer 113 may be interposed between the incidence plane 111 and the radiating portion 83. Thereby, the directionality of the radio waves that pass through the air layer and the dielectric lens and travel can be more greatly adjusted.

Figure 10:
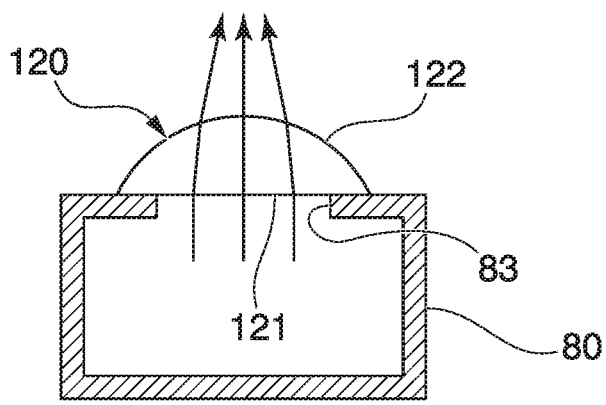
FIG. 10 is a sectional view orthogonal to a leaky waveguide and a dielectric lens of a wireless power supply device according to a second modification of the fourth embodiment in a circumferential direction.

Furthermore, as a second modification of the fourth embodiment, as illustrated, for example, in FIG. 10, an emission plane 122 located on the opposite side of an incidence plane 121 of a dielectric lens 120 may be formed in a convex curved shape with respect to a traveling direction of the radio waves. Thereby, the radio waves radiated from the emission plane 122 are condensed in an opening direction of the radiating portion 83. Therefore, an intensity of the radio waves can be enhanced, and the radio waves can be stably supplied to a power-receiving antenna 52.

While embodiments of the present invention have been described, the present invention is not limited to the embodiments, and can be appropriately modified within the scope not departing from the gist of the present invention.

For example, while the power transmitter 171 is constituted of the two leaky waveguides 80 in the second embodiment, it may be constituted of three or more leaky waveguides 180. In this case, the leaky waveguides 180 having a circular arc shape are arranged with ends thereof facing via a gap, and thereby an annular power transmitter 171 can be constituted as a whole.

Since the plurality of radiating portions 83 are formed at each of the leaky waveguides 180, the leaky waveguides 180 can radiate the radio waves in the same way as a plurality of divided patch antennas. For this reason, the structure of the entire device can be simplified. Even in the case where the phases of the radio waves radiated from each of the leaky waveguides 180 are adjusted by the phase shifter 291, the adjustment may be performed for each the leaky waveguides 180, not for each the radiating portions 83 as well as. Therefore, in addition to the simplification of the structure, labor of the work can be sharply reduced.

In the embodiments, the example in which the leaky waveguides 80 and 180 are adopted as the leaky antennas has been described. However, for example, other leaky antennas such as a leakage coaxial cable may be used.

In the embodiments, the example in which the wireless power supply device 70 and the telemetric measuring system 40 are applied to the turbine 30 of the gas turbine 1 has been described. However, for example, the wireless power supply device 70 and the telemetric measuring system 40 may be applied to the compressor 10 of the gas turbine 1 or other rotating machines such as a steam turbine.

Hereinafter, a fifth embodiment of the present invention will be described in detail on the basis of the figures.

The fifth embodiment illustrated below is no more than an illustrative example, and is not intended to exclude any of various modifications or applications of technologies that are not specified in the following embodiments. Constitutions of the following embodiments can be variously modified and carried out within the scope not departing from the gist of the present invention, can be selected or rejected as needed, or can be appropriately combined.

First, a related art of the fifth embodiment will be described.

As an operation monitoring system for monitoring an operation situation of the turbine, a system configured to arrange sensors, which detect predetermined physical amounts such as strains or temperatures of blades of the turbine and wirelessly transmit detected signals indicating the physical amounts which the sensors have detected to a stationary side (a ground side) and perform predetermined signal processing is proposed.

In this type of operation monitoring system, a plurality of transmitters are arranged at blades (a rotating body side) along with a plurality of sensors, and the detected signals indicating the predetermined physical amounts are sent to the stationary side via the transmitters. Here, driving power of the transmitters is supplied from the stationary side by a wireless power-supplying system.

Figure 11:
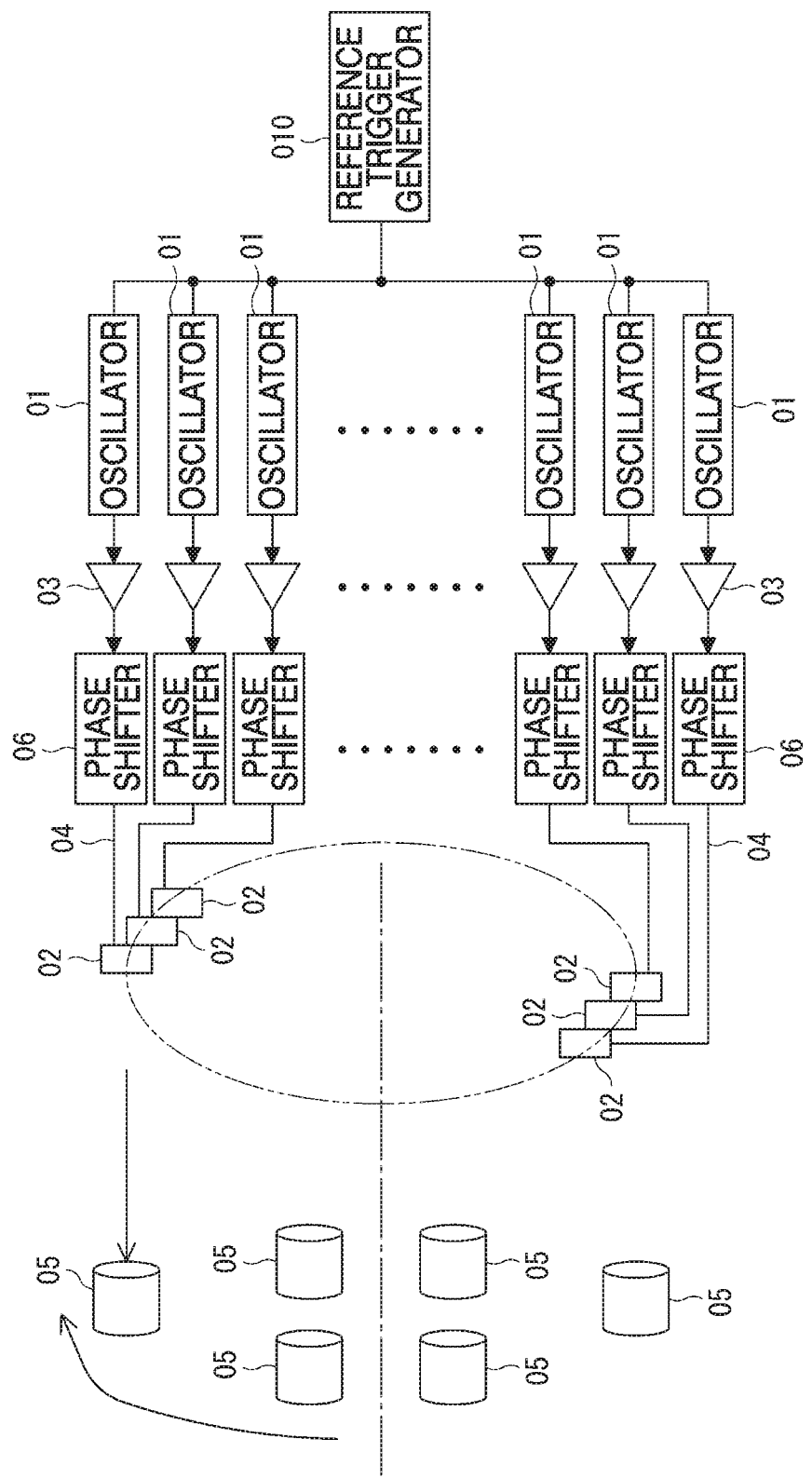
FIG. 11 is a block diagram illustrating a wireless power-supplying system according to the related art.

FIG. 11 is a block diagram illustrating a wireless power-supplying system according to the related art. As illustrated in the same figure, a plurality of power-transmitting antennas 02 arranged in an annular shape are connected to oscillators 01 that are on the stationary side via amplifiers 03 by wires 04. The oscillators 01 are connected to a single reference trigger generator 010 in parallel, and are driven together by an oscillating trigger signal which the reference trigger generator 010 sends.

Meanwhile, a plurality of power-receiving modules 05 (six power-receiving modules 05 in the figure) installed in the transmitters (whose main bodies are not illustrated) are arranged in the blades (not shown) of the turbine on the rotating body side in an annular shape along with the transmitters. Thus, radio waves radiated toward the power-receiving modules 05 via the power-transmitting antennas 02 are converted into power by the power-receiving modules 05, and the power is supplied as driving power of predetermined loads such as the transmitter main bodies or the sensors. The transmitters driven by such power wirelessly send the detected signals, which indicate the predetermined physical amounts detected by the sensors, such as strains or temperatures of the blades, to a signal processor (not shown) of the stationary side.

As described above, in the wireless power-supplying system, the radio waves radiated from the power-transmitting antennas 02 arises a phase shift caused by a difference between lengths of the wires 04 from the oscillators 01 to the power-transmitting antennas 02. That is, since each of the oscillators 01 oscillates a high frequency signal of a GHz order, an influence on a phase shift of an oscillating signal delayed to correspond to the length of the wire 04 becomes notable, so that interference with the radio waves from the neighboring power-transmitting antennas 02 occurs, and a reduction in a level of the received power on a power-receiving side is caused.

Figure 12:
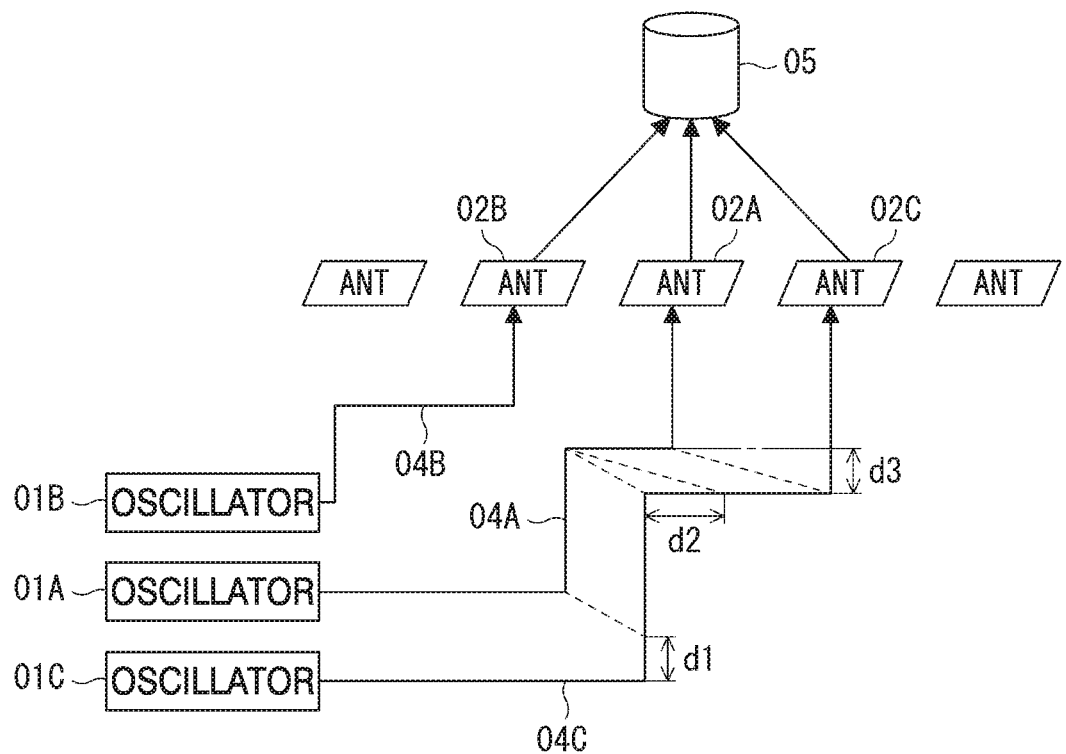
FIG. 12 is a schematic view conceptually illustrating a positional relationship between wires and power-transmitting antennas connected to the wires and a power-receiving module in the related art.

To be more specific, FIG. 12 is a schematic view conceptually illustrating a positional relationship between a wire and a power-transmitting antenna connected to the wire, and a power-receiving module in the related art. As illustrated in the same figure, a level of power received by one power-receiving module 05 is most strongly affected by an intensity of a radio wave radiated from the power-transmitting antenna 02A that directly faces the power-receiving module 05 in front of the power-receiving module 05. The level of power is then affected by an intensity of radio waves radiated from power-transmitting antennas 02B and 02C on both sides of the power-transmitting antenna 02A. Here, each of the power-receiving modules 05 directly faces the power-transmitting antennas 02B, 02A and 02C of the stationary side in association with rotation of the blades in sequence.

Here, in the case where lengths of wires 04A, 04B and 04C from oscillators 01A, 01B and 01C to the power-transmitting antennas 02A, 02B and 02C are different, the radio waves radiated from the power-transmitting antennas 02A, 02B and 02C have a predetermined phase difference corresponding to a length difference of the wires 04B and 04C relative to the wire 04A. That is, in FIG. 12, for example, the length of the wire 04C from the oscillator 05C to the power-transmitting antenna 02C becomes longer than that of the wire 04A from the oscillator 05A to the power-transmitting antenna 02A by an amount at which lengths of distances d1, d2 and d3 are added, and the length of the wire 04B from the oscillator 05B to the power-transmitting antenna 02B is also different from the length of the wire 04A.

Figure 13:
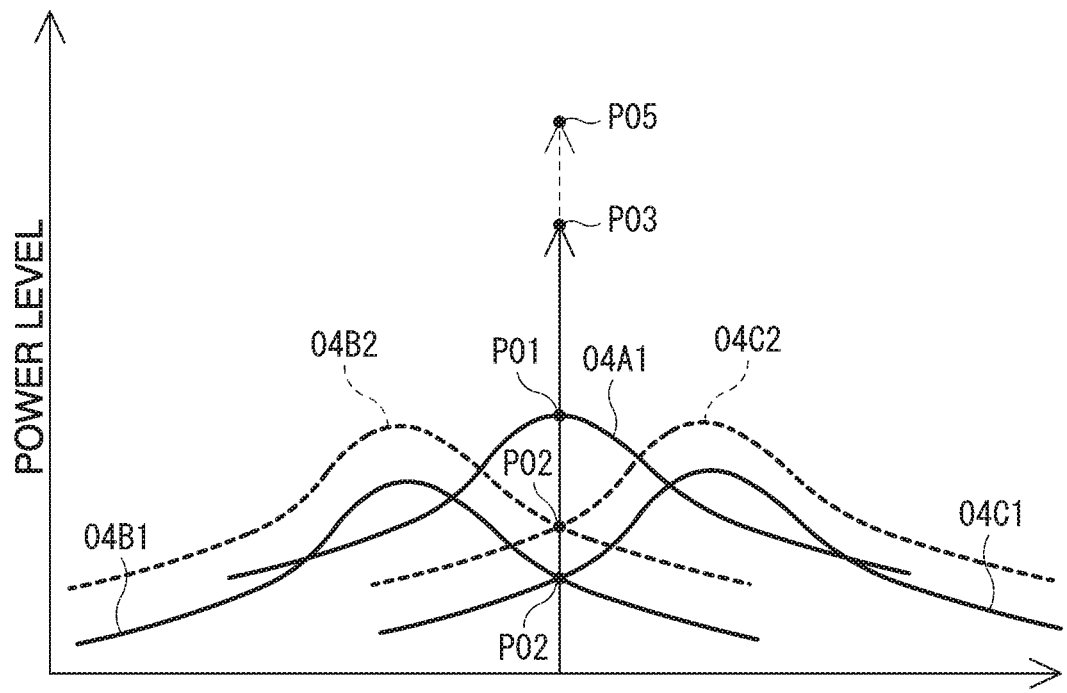
FIG. 13 is a characteristic view illustrating intensities of radio waves (power levels) at a position where the power-receiving module illustrated in FIG. 12 directly faces the power-transmitting antenna.

Thus, in the case where no measures are taken, power level characteristics caused by the radiated radio waves from the power-transmitting antennas 02B and 02C with respect to the power-transmitting antenna 02A are represented by solid lines 04B1 and 04C1 in FIG. 13. Here, FIG. 13 is a characteristic graph illustrating intensities of the radio waves (power levels) of the power-transmitting antennas 02B, 02A and 02C at a position where the power-receiving module 05 illustrated in FIG. 12 directly faces the power-transmitting antenna 02A. In the FIG. 13, wherein the horizontal axis corresponds to positions of the power-transmitting antennas 02B, 02A and 02C. As illustrated in FIG. 13, radio wave intensity peaks of the power-transmitting antennas 02B and 02C are reduced by a phase difference compared to a radio wave intensity peak of the power-transmitting antenna 02A. In this case, a power level P03 to which the power-receiving module 05 directly facing the power-transmitting antenna 02A receives power results in adding power levels P02 caused by the radio waves radiated from the power-transmitting antennas 02B and 02C to a power level P01 caused by the radio wave radiated from the power-transmitting antenna 02A. That is, P03=P01+2·P02.

In contrast, in the wireless power-supplying system according to the related art illustrated in FIG. 11, the phases of the radio waves radiated from the power-transmitting antennas 02 with the phase shifters 06 interposed between the oscillators 01 and the power-transmitting antennas 02 are arranged. As a result, a reduction in the radio wave intensities of the power-transmitting antennas 02B and 02C is inhibited, and intensity characteristics of the radio waves (power level characteristics) that are radiated from the power-transmitting antennas 02B and 02C and are power-received by the power-receiving module 05 are improved to be indicated by dotted lines 04B2 and 04C2 in FIG. 13. Thereby, a power level P05 to which the power-receiving module 05 directly facing the power-transmitting antenna 02A receives power results in adding power levels P04 caused by the radio waves radiated from the power-transmitting antennas 02B and 02C to the power level P01 caused by the radio wave radiated from the power-transmitting antenna 02A. That is, P05=P01+2·P04. In the related art, the phase shifters 06 are provided, and thereby the power level characteristics are improved by a difference between the power level P05 and the power level P04.

In this way, in the related art, oscillating frequencies of the oscillators 01 are controlled, and phase shift amounts caused by the phase shifters 06 are adjusted such that the phases of the radio waves radiated from the power-transmitting antennas 02 are arranged by removing the phase shift caused by the frequencies of the radio waves radiated from the power-transmitting antennas 02 as well as the lengths of the wires 04.

In the wireless power-supplying system according to the related art illustrated in FIG. 11, since the phase shifters 06 for correcting a phase delay caused by the difference between the lengths of the wires 04 are arranged, the phase shifters 06 become a factor that obstructs miniaturization of the facility of the stationary side, and work for adjusting the phase shift amounts of the phase shifters 06, which needs to be individually performed on each of the phase shifters 06, is troublesome. This requires much time.

In view of the problems of the related art, the present embodiment provides a system for wirelessly supplying power to a rotating body and a turbine system which are capable of arranging the phases of the radio waves radiated from the power-transmitting antennas without providing the phase shifters.

Embodiment of the Wireless Power-Supplying System

Figure 14:
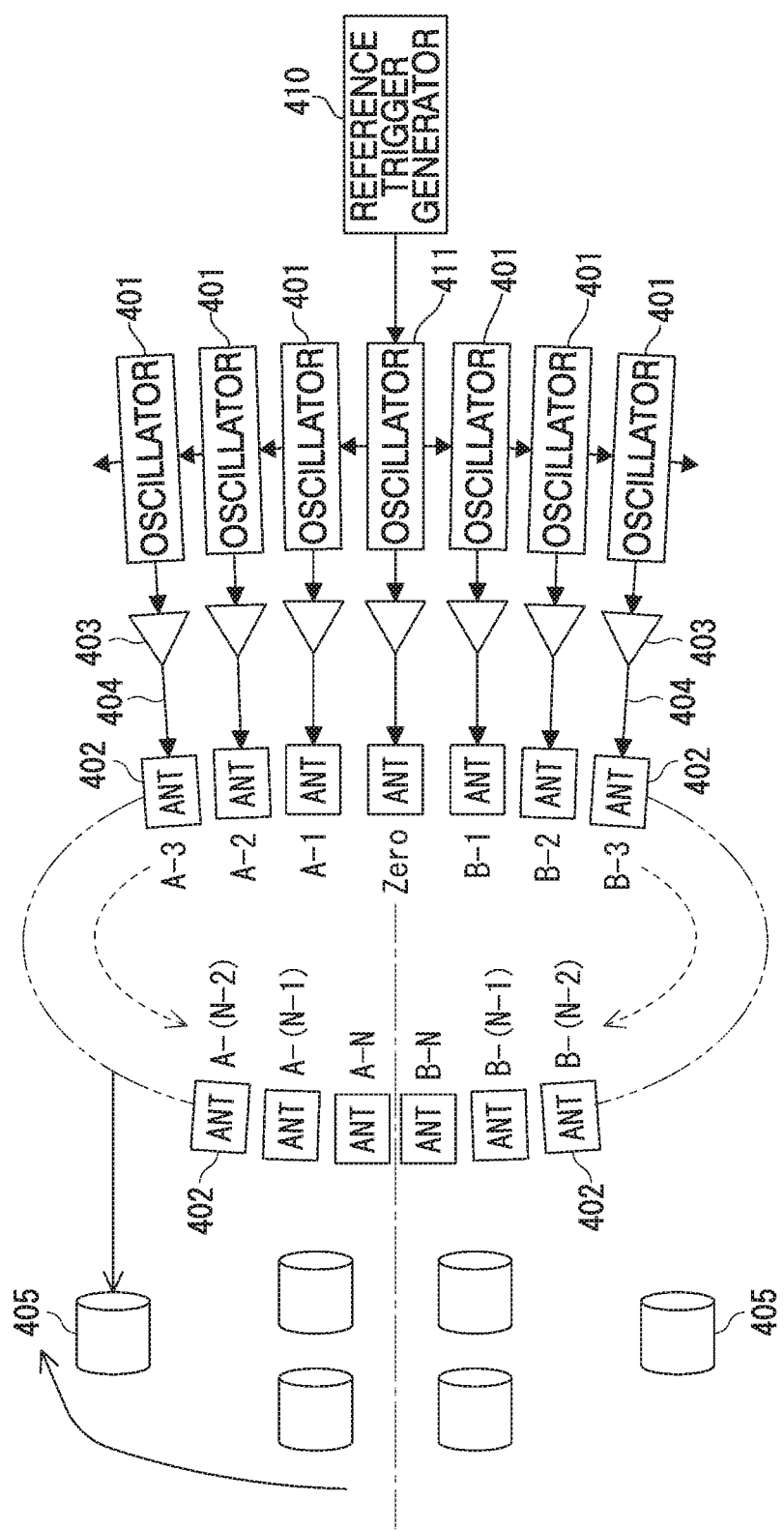
FIG. 14 is a block diagram illustrating a wireless power-supplying system according to a fifth embodiment.

FIG. 14 is a block diagram illustrating a wireless power-supplying system according to a fifth embodiment. As illustrated in FIG. 14, the wireless power-supplying system according to the present embodiment supplies driving power of transmitters (whose main bodies are not illustrated), which are arranged in rotating bodies such as blades of a turbine, from a plurality of oscillators 401 via power-transmitting antennas 402 arranged in an annular shape. Here, electromagnetic energy based on radio waves which power-receiving modules 405 receive is converted into power, and is supplied as the driving power of the transmitters. The power converted by the power-receiving modules 405 is also used as power of sensors that detect predetermined physical amounts to be monitored in operation, such as temperatures or strains of the rotating bodies such as the blades of the turbine. Here, the power-receiving modules 405 are arranged in an annular shape such that a plurality of power-receiving modules 405 (six power-receiving modules 405 in the figure) fewer than the power-transmitting antennas 402 are normally opposed to the power-transmitting antennas 402.

Figure 15:
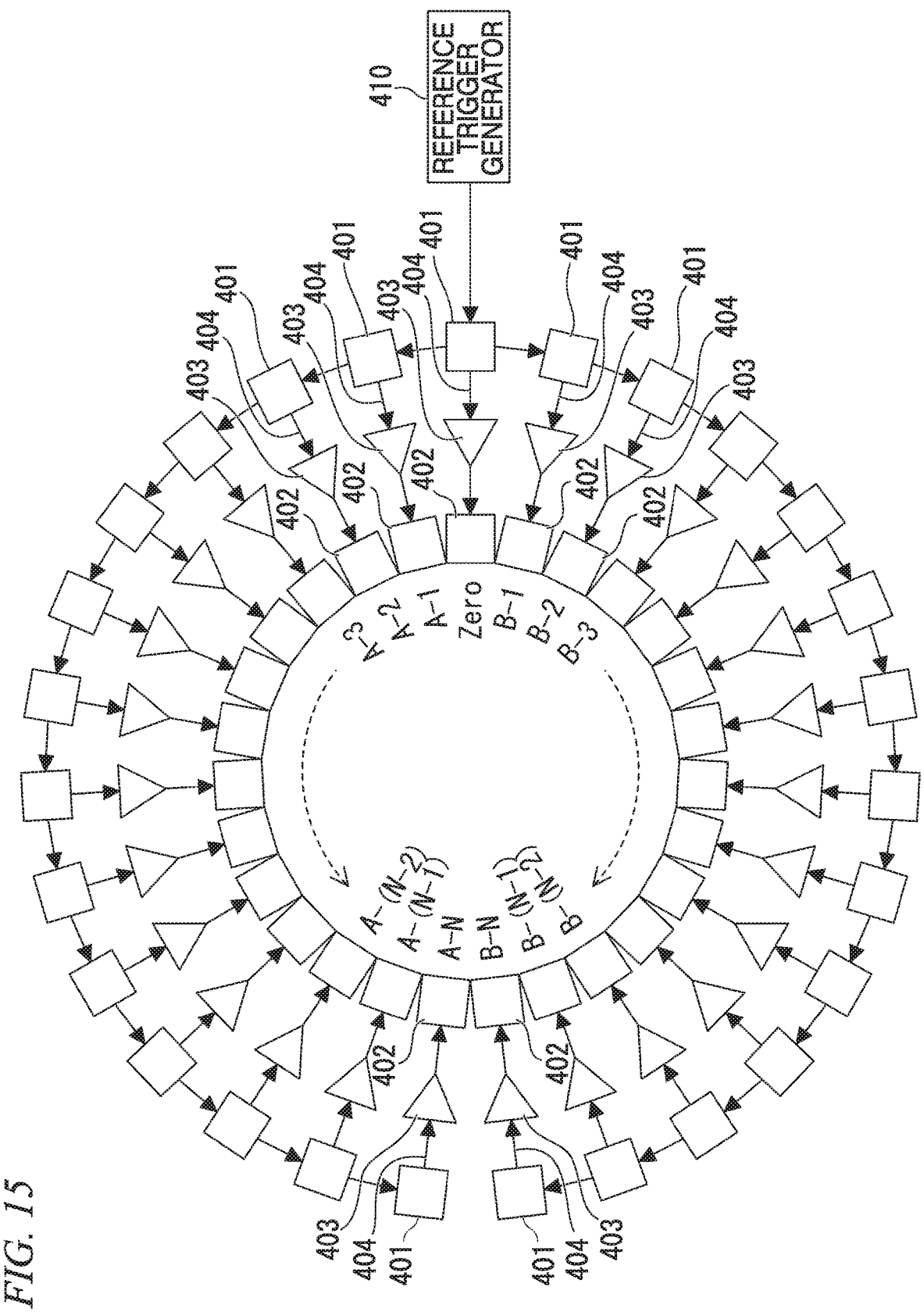
FIG. 15 is a block diagram illustrating a state in which arrangement of a device on a stationary side of the present embodiment illustrated in FIG. 14 is viewed from the front.

FIG. 15 is a block diagram illustrating a state in which arrangement of a device on a stationary side of the present embodiment illustrated in FIG. 14 is viewed from the front. Here, the present embodiment will be described on the basis of both figures where FIG. 15 is added to FIG. 14.

The oscillators 401 are arranged in an annular shape to correspond to the power-transmitting antennas 402. A single reference oscillator 411 is driven first by an oscillating trigger signal which a reference trigger generator 410 generates, and then the oscillators 401 adjacent to the reference oscillator 411 in the counterclockwise and clockwise directions are driven by the oscillating trigger signal sent from the single reference oscillator 411. Successively, the oscillator 401 that is adjacent in the counterclockwise direction and the oscillator 401 that is adjacent in the clockwise direction are sequentially driven by oscillating trigger signals that are sent from the oscillator 401 adjacent to the oscillator 401 (close to the reference oscillator 411) in the clockwise direction and the oscillator 401 adjacent to the oscillator 401 (close to the reference oscillator 411) in the counterclockwise direction. That is, the oscillators 401 initiate predetermined oscillating operations while sequentially moving in the counterclockwise and clockwise directions by the oscillating trigger signals sent from the oscillators 401 that are adjacent in the clockwise and counterclockwise directions. Here, in the present embodiment, all wires 404 from the oscillators 401 to the power-transmitting antennas 402 via amplifiers 403 have the same length. That is, all power-transmitting units, each of which is constituted of the oscillator 401, the amplifier 403, and the power-transmitting antenna 402, have the same constitution and are arranged in an annular shape.

Here, a sign of the power-transmitting unit to which the single reference oscillator 411 driven first belongs is set as (Zero), and signs of the power-transmitting units that are sequentially adjacent to the power-transmitting unit (Zero) in the clockwise and counterclockwise directions are set as A-1, A-2, A-3, . . . , A-(N−2), A-(N−1), and A-N in relation to the counterclockwise direction, and B-1, B-2, B-3, . . . , B-(N−2), B-(N−1), and B-N in relation to the clockwise direction.

Thus, the power-transmitting units (A-1) and (B-1) start to be driven by the oscillating trigger signal which the reference trigger generator 410 generates. And the power-transmitting unit (A-2) starts to be driven by the oscillating trigger signal which the oscillator 401 of the power-transmitting unit (A-1) adjacent in the clockwise direction sends. The power-transmitting unit (B-2) starts to be driven by the oscillating trigger signal which the oscillator 401 of the power-transmitting unit (B-1) adjacent in the counterclockwise direction sends.

Similarly to the above, the power-transmitting units (A-3) to (A-N) and the power-transmitting units (B-3) to (B-N) sequentially start to be driven. As a result, radio waves whose phases are completely identical to each other are radiated from the power-transmitting units (that is, for example, the power-transmitting unit (A-3) and the power-transmitting unit (B-3)) whose numbers are the same after the hyphen in the counterclockwise and clockwise directions. Therefore, radio waves radiated from the power-transmitting unit (A-N) and the power-transmitting unit (B-N) also have the same phase.

In this way, in the present embodiment, since the oscillators 401 are sequentially driven in the counterclockwise and clockwise directions by the oscillating trigger signals which the oscillators driven just before send, a wire length required for a trigger of the oscillator 401 (a wire length between output of the oscillator 401 and trigger input of the oscillator 401 adjacent to this oscillator 401) can be minimized, and a time difference of the oscillating trigger signal between the neighboring transmitting units, which is generated depending on the wire length, can be made small. As a result, in combination with the fact that the time difference between the wires 404 of the power-transmitting unit is approximately zero, the power-transmitting units (A-1) to (A-N), and the power-transmitting units (B-1) to (B-N) are set to have the same length, a phase shift of the radio waves radiated from the power-transmitting antennas 402 can be minimized to the difference of the phases favorably. The wires for transmitting the oscillating trigger signal by which the oscillator 401 is driven can be made shortest. As a result, it is possible to contribute to miniaturization of the system through a reduction of an installation space of the device of the stationary side or the like.

Figure 16:
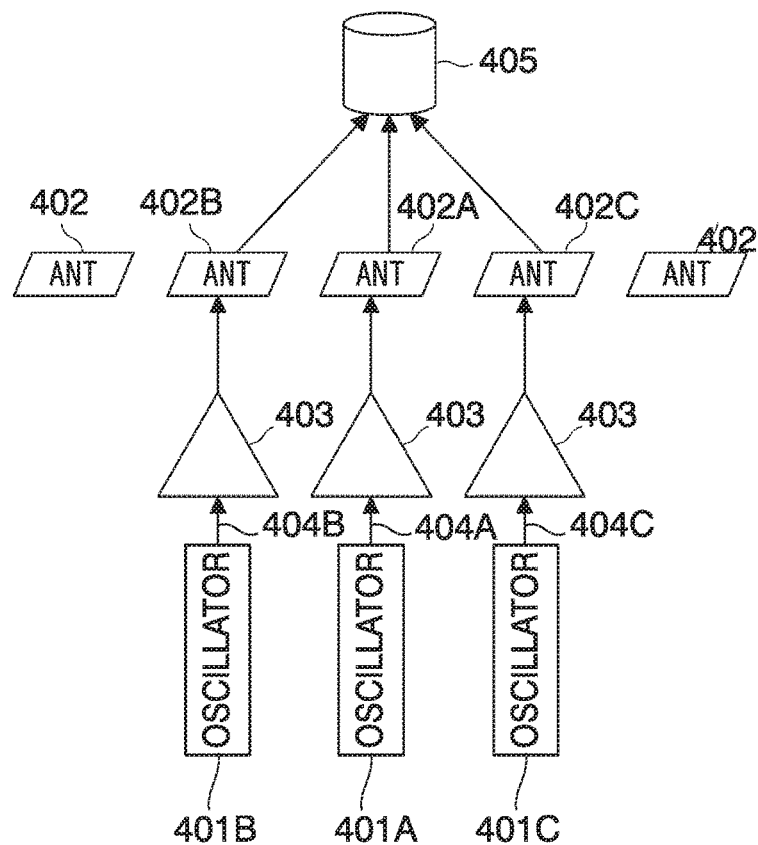
FIG. 16 is a schematic view conceptually illustrating a positional relationship between an oscillator and power-transmitting antennas connected to the oscillator, and a power-receiving module in the fifth embodiment.

To be more specific, as illustrated in FIG. 16 that illustrates characteristics equivalent to FIG. 12 in the related art, a level of power received by a single power-receiving module 405 is most strongly affected by an intensity of a radio wave radiated from a power-transmitting antenna 402A that directly faces the power-receiving module 405. And the level of power then is affected by intensities of radio waves radiated from power-transmitting antennas 402B and 402C on both sides of the power-transmitting antenna 402A. Here, lengths of wires 404A, 404B and 404C from oscillators 401A, 401B and 401C to the power-transmitting antennas 402A, 402B and 402C are the same, and oscillation timings of the oscillator 401A, 401B and 401C also arise only very slight deviation. Thus, the radio waves radiated from the power-transmitting antennas 402A, 402B and 402C are arranged in the same polarity plane.

Figure 17:
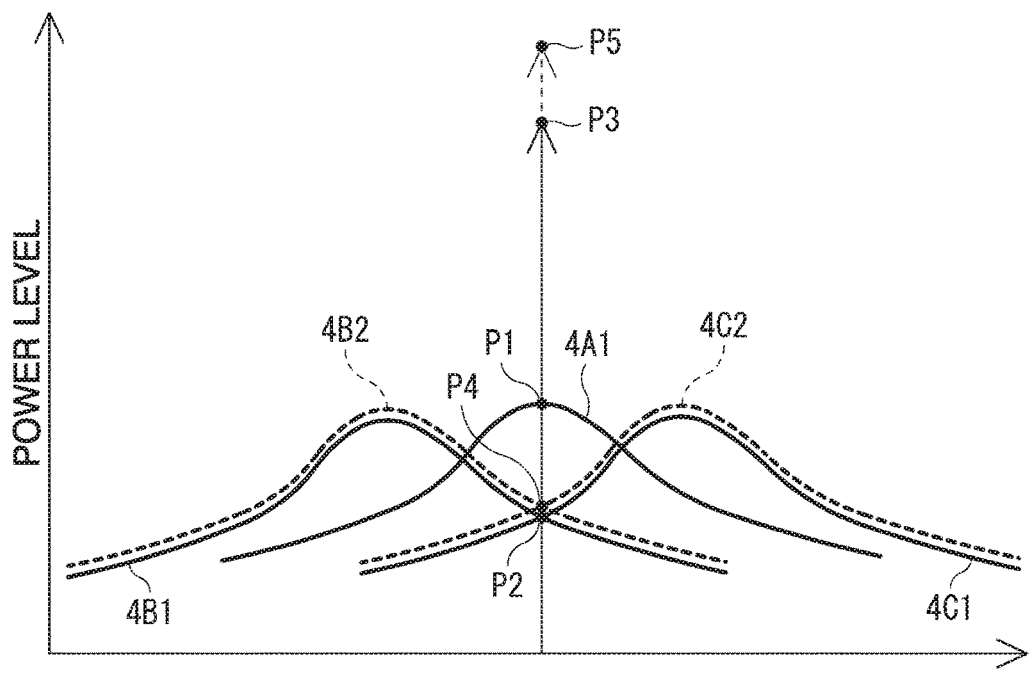
FIG. 17 is a characteristic view illustrating intensities of radio waves (power levels) at a position where the power-receiving module illustrated in FIG. 16 directly faces the power-transmitting antenna.

FIG. 17 is a characteristic view illustrating an intensity of a radio wave (a power level) at a position where the power-receiving module 405 illustrated in FIG. 16 directly faces the power-transmitting antennas 402, and corresponds to FIG. 13. As illustrated in FIG. 17, in this case, power levels obtained from the power-transmitting antennas 402B and 402C are only slightly lower than ideal power levels that are obtained from the power-transmitting antennas 402B and 402C and are indicated by dotted lines 4B2 and 4C2 in FIG. 17, and are nearly the same as indicated by solid lines 4B1 and 4C1 in FIG. 17. Here, the ideal power level is a power level when a phase difference between the radio waves radiated from the power-transmitting antennas 402A, 402B and 402C is zero, and is a power level equivalent to that of the radio wave obtained from the power-transmitting antenna 402A indicated by a solid line 4A1 in FIG. 17.

In the present embodiment, a power level P3 when the power-receiving module 405 directly facing the power-transmitting antenna 402A receives power is obtained by adding power levels P2 caused by the radio waves radiated from the power-transmitting antennas 402B and 402C to a power level P1 caused by the radio wave radiated from the power-transmitting antenna 402A. That is, P3=P1+2·P2. Meanwhile, a maximum power level P5 of this case is obtained by adding two times the power level P4 of the dotted lines 4B2 and 4C2 at a position where the power-receiving module 405 directly faces the power-transmitting antenna 402A to the power level P1, that is, expressed by P5=P1+2·P4. The power level P4 is only slightly lower than the power level P5. That is, in the present embodiment, even without using the phase shifters as in the related art, the power level P4 that is equivalent to or higher than in the related art can be obtained. Especially, in the case where the power-transmitting units (A-N) and (B-N) thought that the phases are completely identical to each other are included, a most favorable power level characteristic is obtained.

In the present embodiment, the power-transmitting units (A-1) to (A-N) and the power-transmitting units (B-1) to (B-N), both of which are an even number in number, are provided by an N number in the counterclockwise and clockwise directions except the reference oscillator 411, but are not limited thereto. An odd number will do. In the case of the even number, as described above, the phases of the radio waves radiated from the power-transmitting units (A-N) and (B-N) that are located at a position opposite to the reference oscillator 411 can be completely arranged.

Embodiment of the Turbine System

Figure 18:
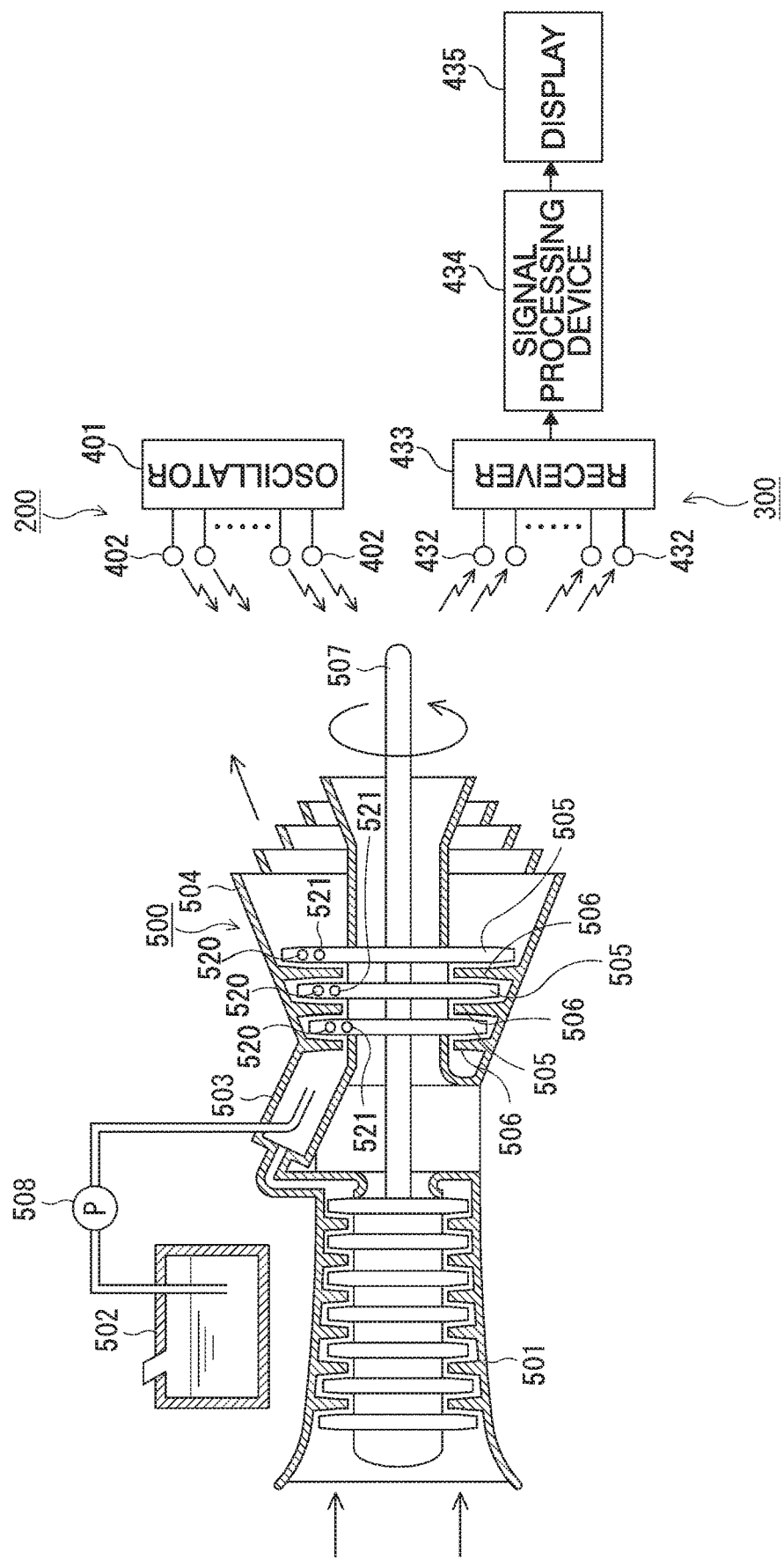
FIG. 18 is a block diagram illustrating a gas turbine system according to a sixth embodiment.

FIG. 18 is a block diagram illustrating a gas turbine system according to a sixth embodiment of the present invention. As illustrated in the same figure, a gas turbine main body 500 has a compressor 501, a fuel tank 502, a combustion chamber 503, a turbine chamber 504, blades 505, vanes 506, and a rotary shaft 507, and outputs a force acting on the blades 505 as a rotating driving force of the rotary shaft 507. To be more specific, the compressor 501 compresses suctioned air, and supplies the compressed air to the combustor 503. Fuel stored in the fuel tank 502 is pumped by a pump 508 and is supplied to the combustion chamber 503. As a result, in the combustion chamber 503, the fuel is burnt under the compressed air to generate a high-temperature high-pressure driving gas. This driving gas is expanded between the vanes 506 and the blades 505 in the turbine chamber 504 to generate a driving force, and rotates the rotary shaft 507 about an axis via the blades 505.

The gas turbine system according to the present embodiment is formed by combining the gas turbine main body 500, a wireless power-supplying system 200, and an operation monitoring system 300. The wireless power-supplying system 200 relates to the above embodiment described on the basis of FIG. 14. Thus, in FIG. 18, the same portions as in FIG. 14 are given the same reference signs, and duplicate description will be omitted.

A plurality of sensors 520 for measuring strains and temperatures of the blades 505 are arranged in the blades 505 that are rotating bodies of the turbine main body 500 in the present embodiment. Detected signals that represent predetermined physical amounts detected by the sensors 520 are radiated as radio waves toward antennas 532 of a stationary side (a ground side) via a plurality of transmitters 521 arranged in the blades 505 that are the rotating bodies along with the sensors 520. The detected signals received by receivers 533 via the antennas 532 are generated as information that represents an operation situation of the gas turbine main body 500 by performing predetermined signal processing at a signal processor 534 and are displayed on a display 535 as needed. Here, each of the transmitters 521 has a power-receiving module 405 (see FIG. 14) installed therein, and necessary driving power is wirelessly supplied from the wireless power-supplying system 200 via the power-receiving modules 405.

Therefore, according to the present embodiment, predetermined operation information on the blades 505 of the gas turbine 500 can be stably sent to the stationary side over a long period of time by the transmitters 521 that are supplied with driving power with high efficiency by the wireless power-supplying system illustrated in FIG. 14. As a result, qualified operation monitoring of the gas turbine main body 500 can be performed.

In the above embodiment, the blades of the gas turbine have been described as the rotating bodies by way of example, but are not limited thereto. As long as power as electromagnetic energy is supplied to the transmitters arranged in the rotating bodies, the rotating body is particularly no restriction, and can be widely applied.

INDUSTRIAL APPLICABILITY

According to the wireless power supply device, the telemetric measuring system, the rotating machine, the system for wirelessly supplying power to a rotating body, and the turbine system, a flexibility of installation can be improved, and complication and troublesomeness of work can be inhibited.

REFERENCE SIGNS LIST

1 Gas turbine
10 Compressor
11 Compressor rotor
12 Compressor casing
13 Compressor blade row
14 Compressor blade
15 Compressor vane row
16 Compressor vane
20 Combustor
30 Turbine
31 Turbine rotor (rotor)
31a Turbine disk
32 Turbine casing
32a Stationary component (stator)
32b Stationary component main body
32c Protrusion
33 Turbine blade row
34 Turbine blade
35 Turbine vane row
36 Turbine vane
40 Telemetric measuring system
50 Rotor-side unit
51 Power-receiving module
52 Power-receiving antenna
53 Secondary battery
54 Sensor
55 Transmitter
60 Stator-side unit
61 Receiver
62 Signal processor
63 Display
70 Wireless power supply device
71 Power transmitter
80 Leaky waveguide (leaky antenna)
81 First end
82 Second end
83 Radiating portion
84 Radiating portion
90 Oscillator
170 Wireless power supply device
171 Power transmitter
180 Leaky waveguide
181 First end
182 Second end
183 Radiating portion
190 Reference oscillator
270 Wireless power supply device
290 Power divider
291 Phase shifter
100 Dielectric lens
101 Incidence plane
102 Emission plane
110 Dielectric lens
111 Incidence plane
112 Emission plane
113 Air layer
120 Dielectric lens
121 Incidence plane
122 Emission plane
O Axis
R Rotational direction
Zero, (A-1) to (A-N), (B-1) to (B-N) Power-transmitting unit
401 Oscillator
402 Power-transmitting antenna
404 Wire
405 Power-receiving module
410 Reference trigger generator
520 Sensor
521 Transmitter
500 Gas turbine main body
505 Blade (rotating body)
200 Wireless power-supplying system
300 Operation monitoring system

The invention claimed is:

1. A wireless power supply device which wirelessly supplies power from a stator side to a plurality of power-receiving antennas disposed on a rotor rotated about an axis at intervals in a circumferential direction, the wireless power supply device comprising:
an oscillator configured to oscillate a high-frequency signal;
an annular power transmitter configured to have a leakage antenna in which a plurality of radiating portions which radiate the high-frequency signal as a radio wave are arranged in the circumferential direction and extend in a circular arc shape in the circumferential direction;
a power divider configured to divide the power of high-frequency signal which the oscillator oscillates to the leakage antennas; and
a phase shifter configured to adjust a phase of the high-frequency signal divided to the leakage antennas by the power divider,
wherein the power transmitter has an annular shape in which a plurality of leakage antennas including the leakage antenna are arranged in the circumferential direction via a gap between ends thereof in the circumferential direction.

2. The wireless power supply device according to claim 1, comprising a dielectric lens configured to cover at least some of the radiating portions.

3. The wireless power supply device according to claim 1, wherein the leakage antenna is a leakage waveguide.

4. A telemetric measuring system comprising:
a stator-side unit configured to have the wireless power supply device defined in claim 1 and a receiver that is provided on the stator side and receives wireless information; and
a plurality of rotor-side units configured to have a power-receiving module that includes the power-receiving antennas, sensors that are driven by power which the power-receiving antennas receive and that detect a state of the rotor, and transmitters that are driven by the power which the power-receiving antennas receive and that transmit detected signals of the sensors as wireless information, and provided on the rotor at intervals in the circumferential direction.

5. A rotating machine comprising:
the stator;

the rotor configured to have a rotary shaft that is rotated about the axis relative to the stator, and a plurality of blades that are provided to radially extend from an outer circumferential surface of the rotary shaft; and the telemetric measuring system defined in claim 4, wherein each sensor is provided on the blades.

6. The wireless power supply device according to claim 2, wherein the leakage antenna is a leakage waveguide.

\* \* \* \* \*